March 10, 1964 N. ACKERMAN 3,124,044
HYDROPNEUMATIC DRIVE MECHANISM
Filed March 9, 1961 6 Sheets-Sheet 1
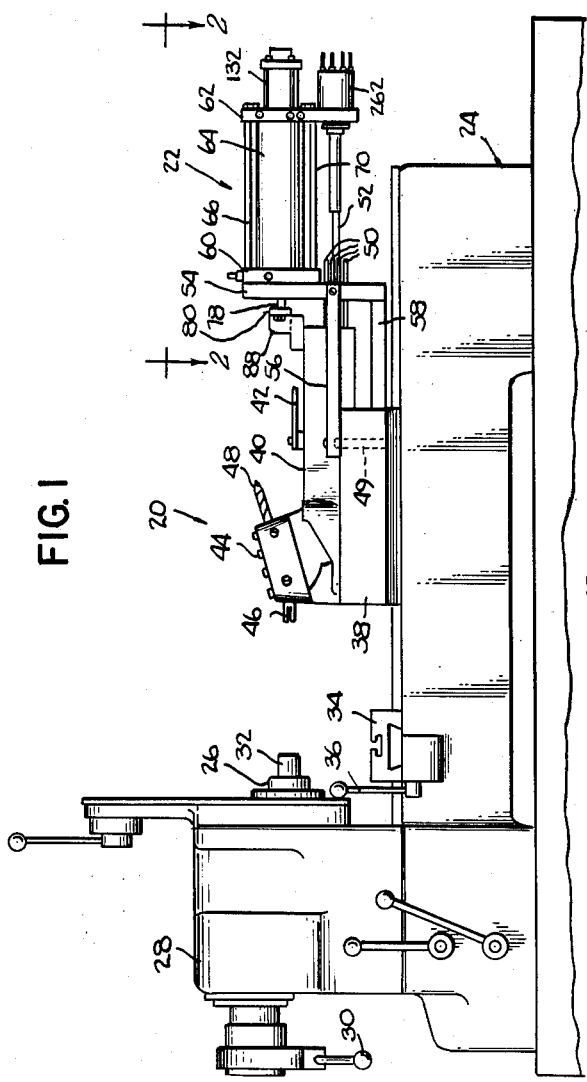
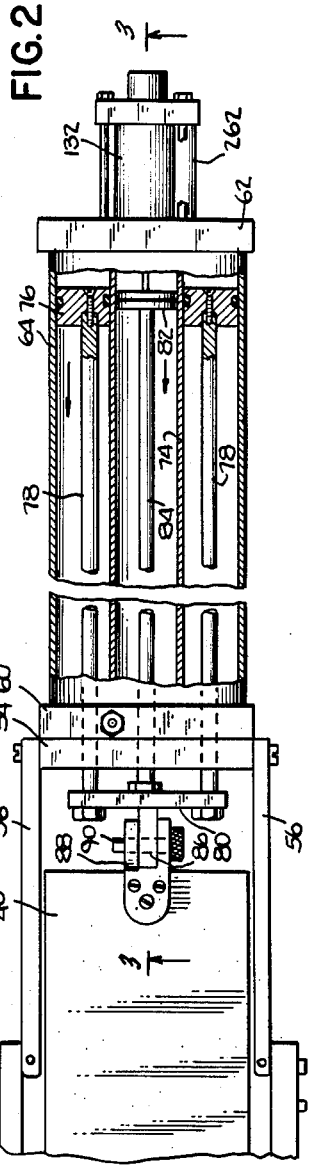
INVENTOR.
NATHAN ACKERMAN
BY
ATTORNEYS

March 10, 1964

N. ACKERMAN 3,124,044

HYDROPNEUMATIC DRIVE MECHANISM

Filed March 9, 1961

INVENTOR.
NATHAN ACKERMAN
BY
ATTORNEYS

March 10, 1964
N. ACKERMAN
3,124,044
HYDROPNEUMATIC DRIVE MECHANISM
Filed March 9, 1961
6 Sheets-Sheet 3
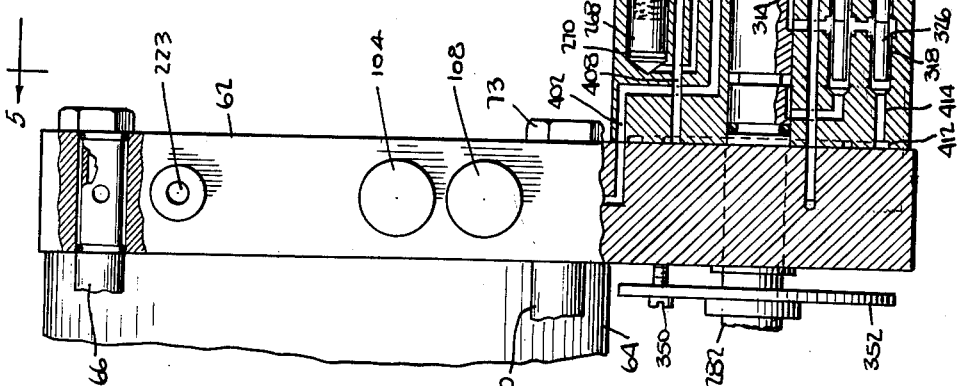
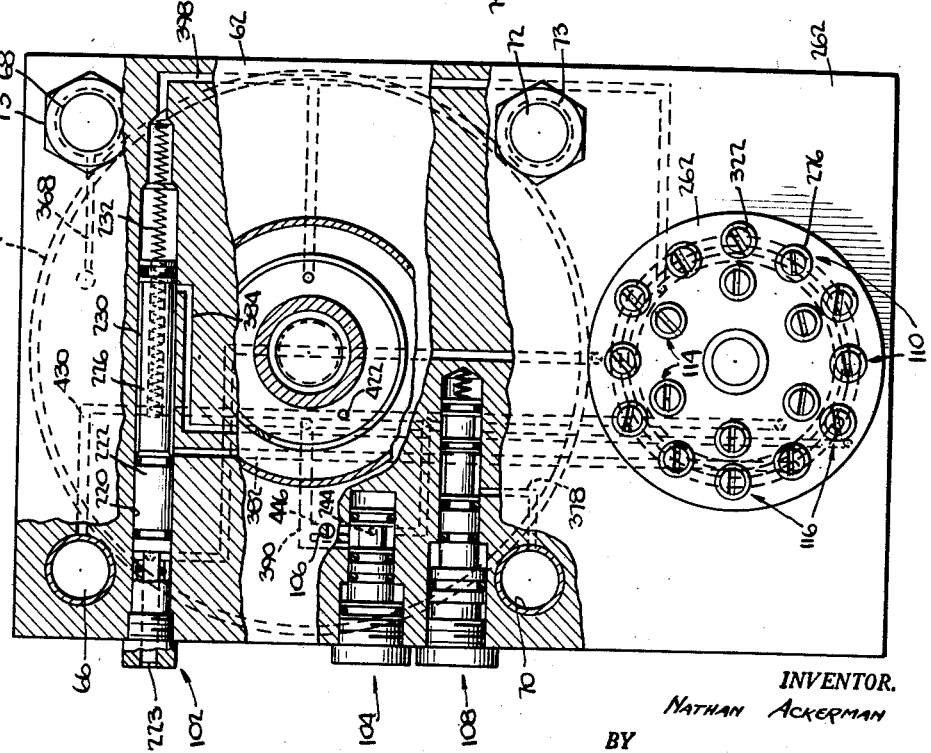
INVENTOR.
NATHAN ACKERMAN
BY
ATTORNEYS

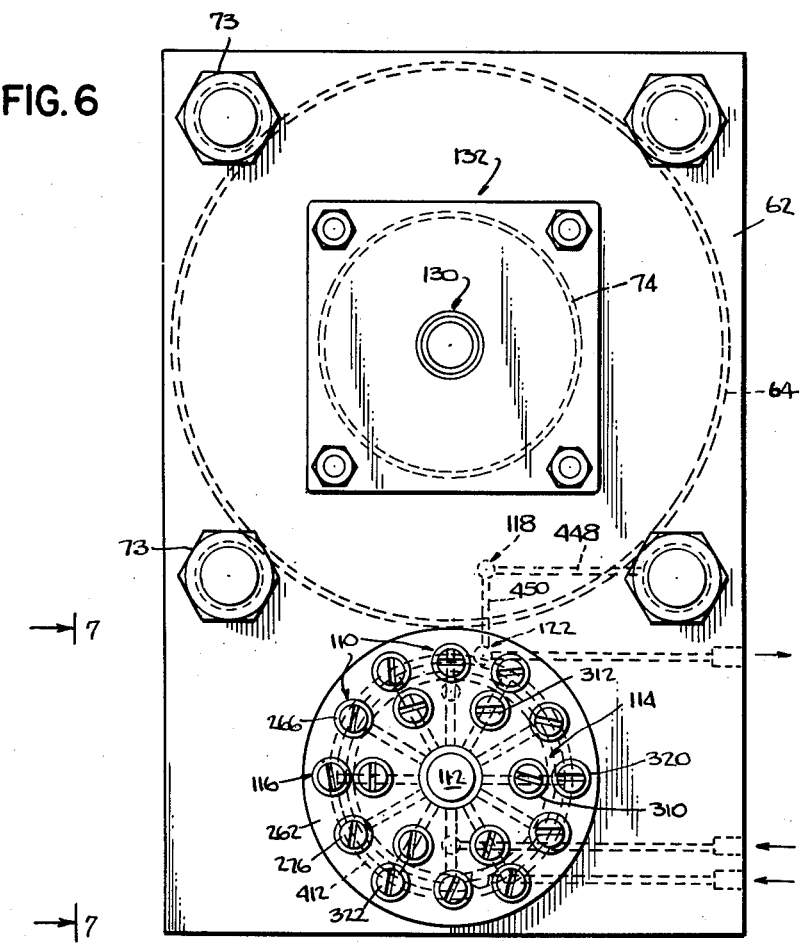
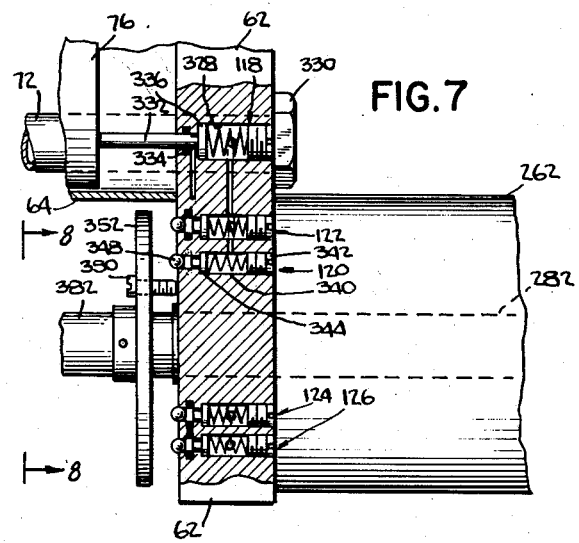
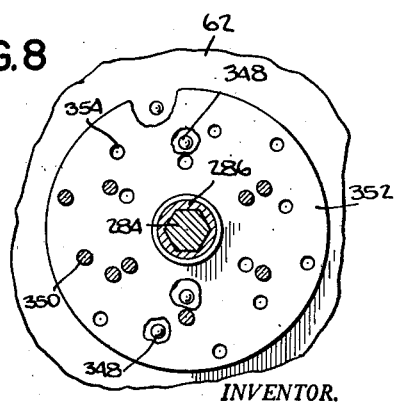

March 10, 1964  N. ACKERMAN  3,124,044
HYDROPNEUMATIC DRIVE MECHANISM
Filed March 9, 1961  6 Sheets-Sheet 5
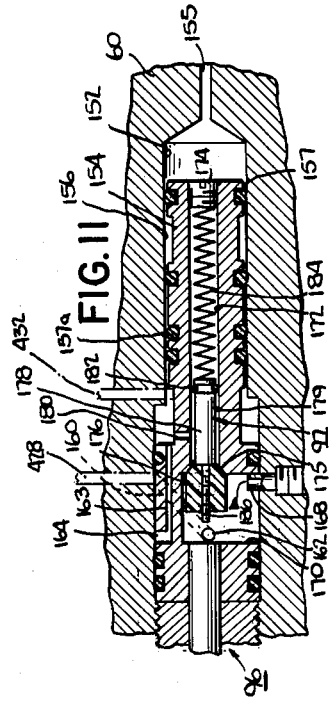
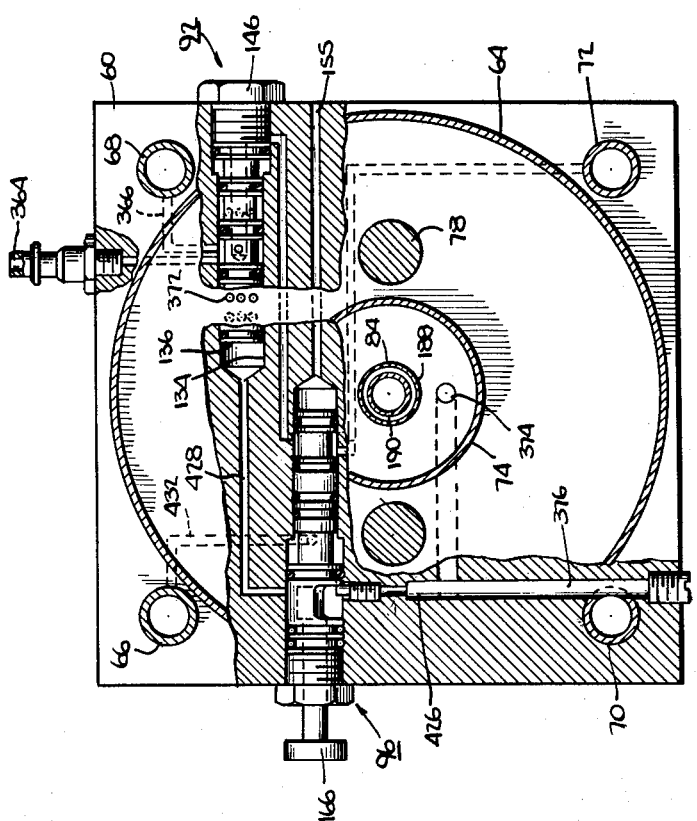
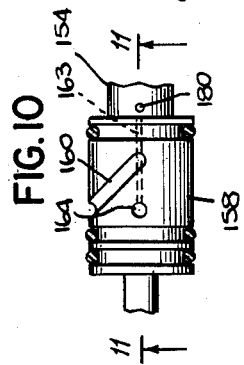
INVENTOR.
NATHAN ACKERMAN
BY
ATTORNEYS

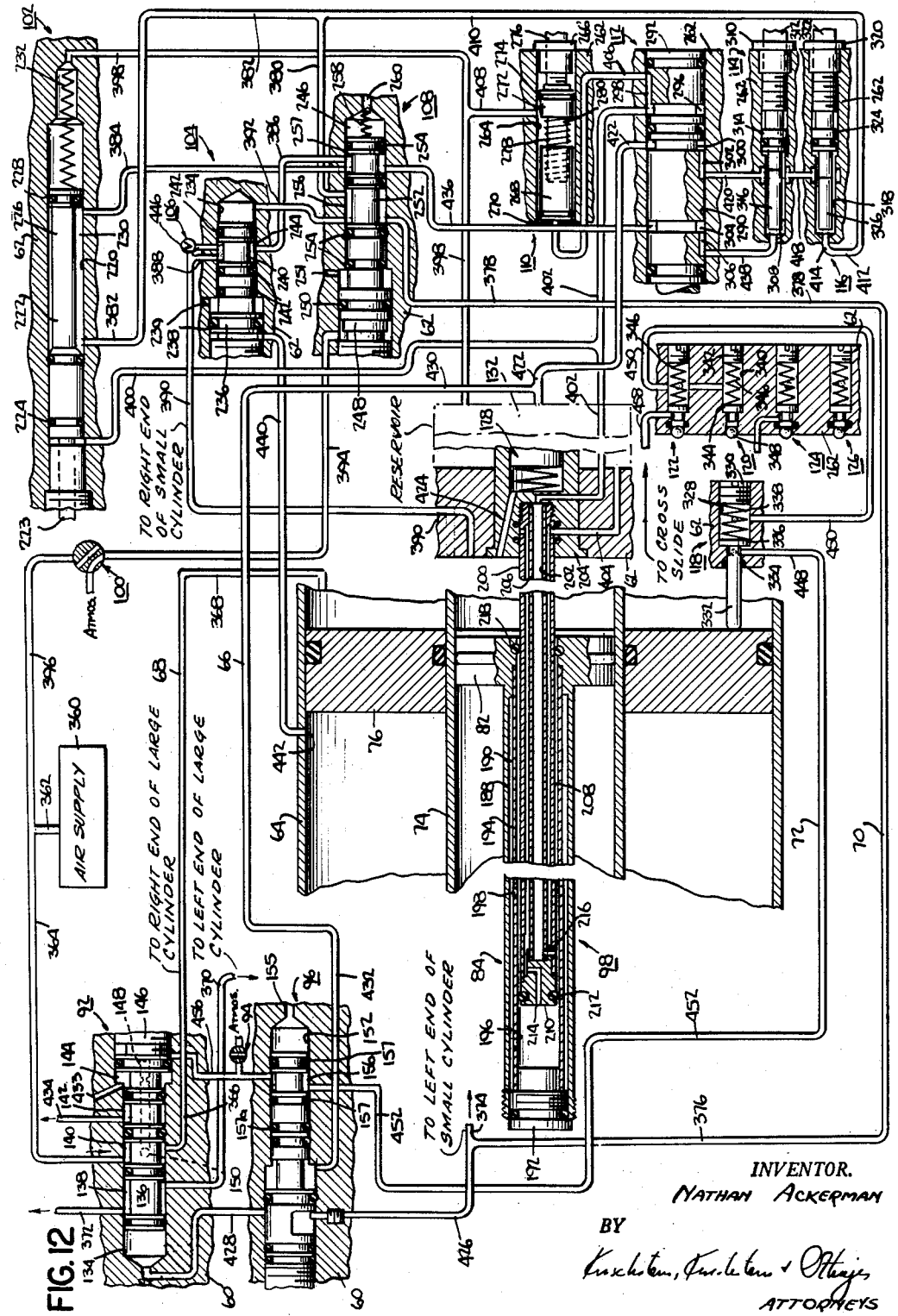

United States Patent Office 3,124,044
Patented Mar. 10, 1964

3,124,044
HYDROPNEUMATIC DRIVE MECHANISM
Nathan Ackerman, Lake Success, N.Y. (% Sandex, Inc., 678 Berriman St., Brooklyn, N.Y.)
Filed Mar. 9, 1961, Ser. No. 94,570
29 Claims. (Cl. 91—280)

This invention relates to hydropneumatic drive mechanisms. More particularly, my invention is concerned with hydropneumatic drive mechanisms of the type which are employed to controllably reciprocate a member by power. For example, such mechanisms are utilized to reciprocate the tool of a lathe or the turret of a screw machine or the chuck of a drill press, or the cutter of a planer, or the bed of a milling machine, etc. The root "hydro" in the adjective "hydropneumatic" denotes the presence of a liquod, i.e. an incompressible fluid such as oil or water, and the root "pneuma" the concurrent presence of a gas, i.e. an elastic fluid such as air.

Specifically, my present invention is concerned with hydropneumatic drive mechanisms which are actuated, i.e. powered, pneumatically and which are restrained for control purposes hydraulically, i.e. by an incompressible liquid, oil being preferred. Drive mechanisms of this character are highly desirable because of their brisk, speedy movement, compactness, low cost of manufacture, low cost of operation and maintenance, and low cost of auxiliary equipment.

A hydropneumatic drive mechanism requires certain control equipment. For example, it requires an automatic cycling control which will automatically start the drive mechanism forward and will reverse it when it reaches a predetermined limit. It also requires a traverse-feed control to subdivide its advance stroke into a rapidly moving forward traversing portion for the period during which a tool approaches work and a slow moving feed portion for the period during which a tool operatively engages work. Likewise, a control is needed for the return stroke, since the initial portion of retrograde movement of the tool should be slow and the subsequent portion after disengagement from the work should be rapid. Furthermore, there should be a control to enable an operator to instantly retract the drive mechanism at any part of the cycle, i.e., an emergency control, and there should be controls for holding the drive mechanism at either end of its stroke and for stopping movement at the end of a single cycle instead of automatically starting a subsequent cycle. There also should be a control for instantly stopping the mechanism anywhere in its stroke, i.e. a panic control.

Heretofore, such controls have been provided by electric circuits and electro-mechanical equipment. I have found that although such circuits and equipment perform satisfactorily in practice, they are subject to various drawbacks. For instance, their initial cost is quite high. Their set-up is delicate and requires highly skilled help. They are prone to break-down, and when repair is required the average serviceman usually is unable to effect it, so that factory men must be sent out into the field to perform the necessary repair work. Furthermore, the electrical and electro-mechanical equipment are rather bulky and the space they occupy frequently is a deterrent to the purchase of the basic hydropneumatic drive mechanism.

It is an object of the present invention to provide an improved hydropneumatic drive mechanism which avoids the foregoing drawbacks.

More specifically, it is an object of my invention to provide a hydropneumatic drive mechanism which may be devoid of electric and electro-mechanical control equipment and in lieu thereof preferably utilizes in substantially all regulatory devices fluid control equipment, e.g., either hydraulic control or pneumatic control, or a combination thereof.

It is another object of my invention to provide a hydropneumatic drive mechanism of the character described that utilizes control equipment which is extremely compact and, indeed, can be built right into the structural elements of the hydropneumatic drive mechanism without the provision of a separate casing for the control.

It is another object of my invention to provide a hydropneumatic drive mechanism of the character described which utilizes fluid control equipment that is comparatively simple to make, is easy to install and set-up, and can be serviced by average maintenance workers unskilled in electric and electro-mechanical equipment.

It is another object of my invention to provide a hydropneumatic drive mechanism having a fluid control that is characterized by precise and foolproof operation and great flexibility.

It is another object of my invention to provide a hydropneumatic drive mechanism of the character described having a control device which constitutes relatively few and simple parts and is rugged and durable in use.

It is another object of my invention to provide a hydropneumatic drive mechanism of the character described having fluid control equipment which is substantially trouble-free.

Another difficulty experienced with previous hydropneumatic drive mechanisms and in general with power drive mechanisms was the difficulty of correlating the drive mechanism with the equipment to be driven. For example, at a certain point of the advance stroke it was necessary to change the speed of advance from a rapid approach speed to a slow feeding speed. Heretofore, this has been accomplished by mechanically or electro-mechanically interrelating the device to be moved or the support therefor with the drive mechanism. This makes the installation of the drive device difficult, leads to unwieldiness and bulk in the drive mechanism and synchronizing device, and in general lends itself to break-down and repair trouble.

It is another object of the present invention to provide a hydropneumatic drive mechanism which is free of these interconnecting difficulties, to wit, a mechanism of the character described having only a single basic connection with the device to be driven, to wit, a power drive connection between the drive mechanism and the device to be driven, all of the other synchronizing means being wholly contained within the hydropneumatic drive mechanism itself, so that said device is entirely self-contained and therefore can be mounted on existing equipment with far greater ease.

It is another object of my invention to provide a hydropneumatic drive mechanism which is not sensitive to defects in the machine which it is to drive; this is particularly useful where the drive mechanism is employed to actuate a machine that is not in perfect condition.

Heretofore, manufacturers of drive mechanism often have required that an old machine be shipped to their factories for installation of the power drive mechanism since the drive mechanism had to be so precisely controlled that the presence of any unusual tolerance in the old machine might destroy its accuracy of regulation. However, pursuant to my present invention this course no longer has to be followed, since by improved hydropneumatic drive mechanism is capable of being regulated in the field in a manner such as to handle any machine, even a machine which no longer retains its original precision.

It is another object of my invention to provide a hydropneumatic drive mechanism of the character described which, despite its rapidity of movement, can be adapted to work with machines of the type that require a delay at the end of the retraction stroke in order, for instance, to permit a turret to index, or to permit fresh work to be fed into a work holder.

Other objects of my invention in part will be obvious and in part will be pointed out hereinafter.

My invention accordingly consists in the features of construction, combinations of elements and arrangements of parts which will be exemplified in the hydropneumatic drive mechanism hereinafter described and of which the scope of application will be indicated in the appended claims.

In the accompanying drawings in which are shown various possible embodiments of my invention, FIGURE 1 is a side elevational view of a turret lathe having the tool slide thereof reciprocated by a hydropneumatic drive mechanism incorporating my present invention;

FIG. 2 is a partially broken away top auxiliary view of said drive mechanism, the same being taken substantially along the line 2—2 of FIG. 1;

FIG. 4 is an enlarged fragmentary side view of the rear portion of my novel hydropneumatic drive mechanism as it appears with the oil reservoir removed;

FIG. 5 is a rear partially fragmentary view of said mechanism, the same being taken substantially along the line 5—5 of FIG. 4;

FIG. 6 is a rear view of said drive mechanism, the same being taken substantially along the line 6—6 of FIG. 3;

FIG. 7 is a fragmentary partially broken away side view of the rear block and distributor block, the same being taken substantially along the line 7—7 of FIG. 6;

FIG. 8 is a sectional view taken substantially along the line 8—8 of FIG. 7, and showing the actuator plate which is employed to continue or bring to a stop a series of automatic cycling operations;

FIG. 9 is an enlarged sectional view taken substantially along the line 9—9 of FIG. 3 and showing the front block in partial section;

FIG. 10 is a side view of the piston of the selector valve;

FIG. 11 is a longitudinal central sectional view through the selector valve, the same being taken substantially along the line 11—11 of FIG. 10; and FIG. 12 is a flow diagram of the pneumatic and hydraulic circuits utilized in my present invention.

Figure 3:
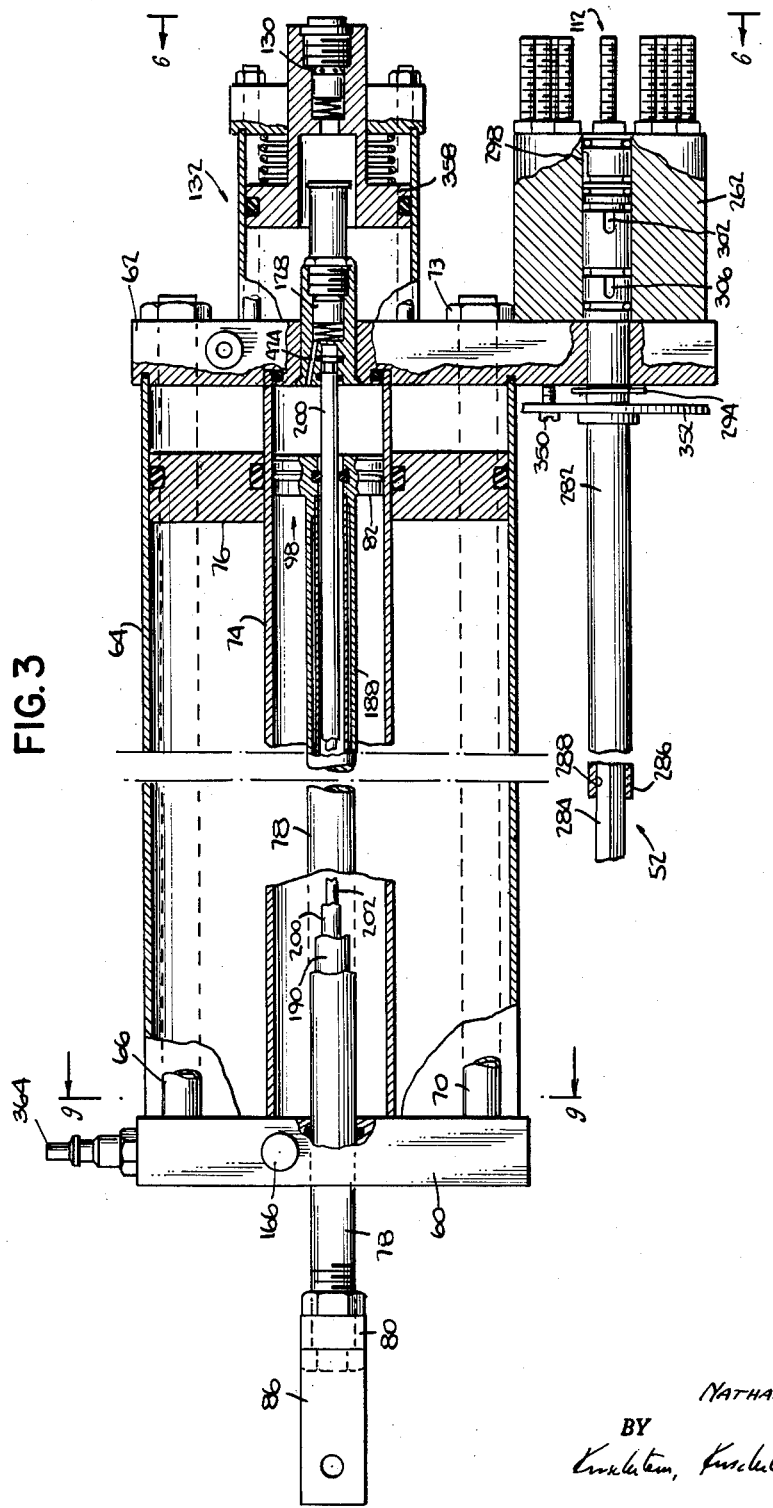
FIG. 3 is an enlarged fragmentary vertical sectional view taken substantially along the line 3—3 of FIG. 2.

Referring now in detail to the drawings, the reference numeral 20 denotes a turret lathe of a conventional type and which, by way of example, has been illustrated as a machine that is adapted to have the tools thereof actuated by my novel hydropneumatic drive mechanism 22.

The turret lathe typically includes a stationary bed 24 at one end of which a rotatable holding arrangement such as a chuck 26 is located. The chuck is designed to be turned by any suitable means, such for instance, as an electric motor (not shown) housed within a casing 28 and arranged to rotate the chuck at any selected speed by means of a train of change gears also located within said casing. The jaws of the chuck may be opened or closed by fluid means or by a lever 30. A workpiece 32 is shown in a position wherein it is engaged by the jaws of the chuck or collet, said workpiece and chuck (or collet) being turned about a common axis when the lathe drive is energized. Slidably mounted on the bed 24 of the machine is a cross slide 34 for performing cutting operations transverse to the axis of rotation of the workpiece. Such cross slide may be manually operated by a lever 36 or, alternatively, may be actuated by a fluid arrangement (not shown).

Also mounted on the bed of the machine is a saddle 38. The saddle can be located at any point along the bed of the machine, being adjustable parallel to the axis of rotation of the chuck, and customarily is clamped in some suitable location. The saddle has slidably mounted thereon for movement parallel to the axis of rotation of the chuck a slide member 40. Said slide member is reciprocatable in ways in the saddle 38, so that it will move toward or away from the chuck 26 and workpiece 32. The slide member can be displaced by hand through the medium of a crank 42, although, as soon will be seen, this is not employed when my hydropneumatic drive mechanism is connected to the slide member (except for setting up).

The slide member carries the usual rotatable turret 44 which mounts a number of tool holders 46 that are adapted to support different tools 48 which may be required for operation upon the workpiece, said tools being adapted to operate sequentially thereon.

As is conventional, the slide member includes a stepping, i.e. indexing, arrangement which, each time that the slide member approaches the end of its retrograde [1] stroke, will turn the turret 44 from one tool position to the next tool position, e.g. if there are six tool positions will rotate the turret 60°. Furthermore, as is customary, the bed 24 is provided with a stationary abutment 49 and the slide member 40 is provided with a series of axially adjustable stops 50, each stop being successively shifted (indexed) into a position in which its path of travel intersects the abutment; i.e. there is associated with each turret position a different adjustable stop 50 which will halt the feed-in movement of the slide member for each turret position so that the slide member 40 can have its forward motion halted at an independently adjustable position for each tool. Customarily the stop members comprise threaded rods which are screwed into a plate (not shown) that is fast to a shaft 52 which turns with the indexing shaft (not shown) of the turret lathe. The indexing shaft translates with the slide member 40 and is turned 60° each time that the turret is rotated 60° (indexed). The abutment member 49 is located so that it will be struck by the tip of only one of the rods 50 which at the time is in a certain angular position. Thereby by individually adjusting the axial positions of said rods the desired different forward stop positions for the different tools are secured.

I have described a turret lathe as an example of a machine which can be actuated by my novel hydropneumatic drive mechanism since said lathe includes a slide member which is adapted to be reciprocated through successive cycles. However it should be pointed out that my invention is not to be limited to such a machine and that my new mechanism can be employed to drive any element either through single cycles or through successive cycles in a controllable manner such as will be hereinafter explained.

My novel hydropneumatic drive mechanism 22 has a stationary portion thereof fixed to a stationary portion of the turret lathe. For convenience such stationary portion of the turret lathe constitutes the saddle 38 inasmuch as this permits the saddle to be shifted on the bed 24 without disturbing the mounting of the drive mechanism. Said drive mechanism includes a vertically extending broad mounting plate 54 located far enough in back of the saddle 38 to permit a full retrograde stroke of the slide member 40. The mounting plate is held in position in any suitable fashion, e.g. by side and bottom struts 56, 58 the forward ends of which are fixed to the saddle and the rear ends of which are fixed to the mounting plate.

A front (left end) block 60 is juxtaposed against the rear face of and securely attached to the mounting plate 54. In addition a rear (right end) block 62 (which integrally includes a distributor block) is parallel to the

---

[1] As applied to the slide member and all parts movable therewith, the term "retrograde" denotes away from the chuck 26 and is synonomous with the terms "return," "rearward" and "feed-out," i.e. is indicative of movement toward the right as viewed in FIGS. 1–4, 7 and 12. The antonyms of the terms "retrograde," "rearward," "return," "feed-out" and "right" are "operative," "forward," "advance," "feed-in" and "left."

front block 60 and is suitably held in rearwardly spaced position from the front block. The mounting for the rear block and distributor block will become apparent as this description proceeds. Interposed between the front and rear blocks 60 and 62 is an outer large tubular shell, i.e. cylinder, 64. The large cylinder extends in an axial direction parallel to the axis of rotation of the chuck 26 and the direction of movement of the slide member 40. Desirably the longitudinal axis of the large cylinder 64 is located in a vertical plane including the longitudinal center line of the slide member so as to minimize lateral skewing.

In order to hermetically seal the ends of the large cylinder 64 to the two blocks 60, 62 the facing surfaces of said blocks are formed with trepanned grooves that receive the ends of the cylinders, said grooves having gaskets bottomed therein. The front and rear blocks are drawn together to compress the large cylinder 64 therebetween by four hollow tierods 66, 68, 70 and 72 and nuts 73 which not only serve upon tightening to seal the ends of the large cylinder 64 but also to hold the rear block and distributor block 62 in secure rotation to the front block. The ends of the hollow tierods are closed and the interiors of said tierods serve to provide passageways the function of which will hereinafter be described in some detail in connection with the operation of my hydropneumatic drive mechanism. The passageways in said tierods will be denoted by the same numbers as the tierods themselves, to wit, 66, 68, 70 and 72. Said tierod passageways are connected to passageways formed within the front, rear and distributor blocks. The tierods are located externally of the outer cylinder so as to leave clear the space within the latter.

Concentrically located within the large outer cylinder 64 is an inner small cylinder 74 the left and right ends of which are received within trepanned grooves in the facing surfaces of the front and rear blocks. These grooves likewise may be bottom-gasketed or, as illustrated (see FIG. 3), one face of each said groove may be laterally recessed to accommodate an O-ring. In either event the space within the small cylinder 74 is hermetically sealed from the annular space within the large cylinder 64 and the annular space within the large cylinder 64 is hermetically sealed from the ambient atmosphere.

An annular piston 76 is slidable within the large cylinder 64 and over the external surface of the small cylinder 74. The external and internal peripheries of said piston are grooved to receive O-rings that slide on the cylinders 64, 74 and seal off from one another the spaces on the opposite faces of said annular piston. Secured to the front face of the annular piston at diametrically opposed points thereon are a pair of piston rods 78. The forward ends of these piston rods pass through the front block 60 where suitable glands are provided to prevent leakage around the same and said ends are tied together by a cross-bar 80.

A central second piston 82 is provided, the same being slidable within the small cylinder 74 in approximate transverse registry with the annular piston 76. The central piston 82 includes an external peripheral groove in which there is located an O-ring that slides against the internal surface of the small cylinder 74 and seals off from one another the spaces on the opposite faces of the piston 82. Functionally integral with the central piston 82 is a piston rod 84 the forward end of which extends through a suitable gland in the front block 60 and is connected to the cross-bar 80. Thus said cross-bar ties together for common movement the outer annular piston 76 sliding in the annular space between the two cylinders and the inner central piston 82 slidable in the small cylinder.

The cross-bar 80 has extending forwardly therefrom a tongue 86 which is received within a yoke 88 and is secured to said yoke by a removable transverse pin 90. The yoke 88 is thereby firmly attached to the slide member 40; hence when the pistons 76, 82 move forwardly they will urge the slide member forwardly and when said pistons move retrogradely they will urge the slide member to its rearmost position.

One or the other of the pistons 76, 82 is driven by admitting fluid under pressure first on one side thereof and then on the other and the other of the pistons serves as a check control or restraint by providing a constrained fluid on opposite faces thereof which fluid is forced from one end of the associated cylinder to the other through a closed loop and through selected alternate paths in said loop whereby in a predetermined manner to fix the rates of to and fro movement of the slide member. In the preferred form of my invention the actuating i.e. driving, fluid is a compressible fluid, to wit a gas, most economically, compressed air. I use this fluid for various reasons, chiefly because pneumatic actuators are characterized by brisk, speedy movement and because the auxiliary equipment, to wit the compressors for supplying compressed air, can be used in smaller capacities then the equivalent pumps for supplying an incompressible fluid at a high pressure, inasmuch as a reserve supply of compressed air can be stored in a tank during standby or idle periods of operation while the same is not true for an incompressible fluid. For the checking (restraining) fluid I prefer to use an incompressible fluid, i.e. a liquid such as oil or water, oil being desirable because it does not tend to corrode the parts.

In order to obtain maximum power for actuation I preferably utilize the annular space between the two cylinders for the actuating means, i.e. I introduce compressed air to alternate sides of the annular piston 76 and I utilize the interior of the small cylinder 74 for the hydraulic control or restraint on the movement of the said annular piston. It may be pointed out that the concentric arrangement of the cylinders is quite advantageous. For instance, the ensuing alignment of the cylinders inhibits the production of any distorting torque. The telescopic relationship of the cylinders reduces the overall length of my hydropneumatic drive mechanism and enables it to be fitted into small spaces where tandem cylinders could not be accommodated. Moreover the telescopic arrangement does not unduly increase the height of my drive mechanism inasmuch as the power obtainable in the annular space between the two cylinders increases as the difference between the squares of the radii of the two cylinders. Furthermore, the concentric arrangement of the cylinders enables the cool expanding compressed air to extract the heat generated in the hydraulically controlled circuit during movement of the hydraulic fluid through restricted passageways.

As thus far described, my hydropneumatic drive mechanism is essentially similar to the hydropneumatic drive mechanisms illustrated and described in my copending applications Serial No. 597,960 for Turret Lathe Control, filed July 16, 1956 and Serial No. 737,092 for Hydropneumatic Feed Device, filed May 22, 1958. However said previous drive mechanisms were regulated by electrical and electro-mechanical equipment which, as indicated earlier herein, were subject to certain disadvantages which I have overcome by my present invention.

My novel control equipment includes several valves and an oil reservoir which are interconnected by plural passageways in a hydropneumatic circuit that is fully illustrated in FIG. 12. In order to simplify the description and understanding of my invention each of the valves, and its location and its construction will be explained in detail and the passageways which connect the same will be described at the time that the operation of my drive mechanism is expounded. Moreover, these passageways will be explained with reference to the flow diagram of FIG. 12, rather than with reference to the various sectional views, since in the latter the connections between the passageway are not always clear inasmuch as the passageways are located in a three dimensional space that cannot be clearly represented on the two dimensional plane of a drawing whereas for the purpose of exposition the passageways have been illustrated in a two dimensional continuum in FIG. 12.

Specifically I provide the following valves, to wit: an automatic cycling valve 92, a start valve 94, a selector valve 96, a supplemental automatic cycling valve 97 a trombone valve 98 (actually a positive displacement pump and, accordingly, hereinafter referred to as the "trombone pump"), a stop valve 100, a bypass (diverting) valve 102, a cushion valve 104, an adjustable cushion restriction valve 106, a shut-off valve 108, a plurality, e.g. six, feed start adjustment (accumulator) valves 110, a distributor valve 112, a plurality, e.g. six, adjustable return feed valves 114, a plurality e.g. six adjustable forward feed valves 116, an end-of-return-stroke sensing valve 118, a repeat-or-stop cycling valve 120, an auxiliary-controlled automatic-cycle-start valve 122, an auxiliary start valve 124, an auxiliary start valve 126, an oil reservoir outlet check valve 128, and an oil reservoir filling check valve 130. I also provide an oil reservoir 132. The valves 94, 96 and 100 are manually controlled (as distingiushed from manually adjustable) and the remaining valves are automatically controlled, depending upon the setting of the manually controlled valves and the existing condition of the drive mechanism.

The automatic cycling valve 92 conveniently is located in the front block 60. Said valve is illustrated in FIGS. 9 and 12. The valve 92 includes a bore 134 and a spindle 136. The opposite ends of the bore are closed and the major portion of the bore is of small diameter. However, one end of the bore, the right hand end as shown in FIGS. 9 and 12, is of large diameter. Suitably mounted on the spindle 136 are a series of sliding annular seals such as piston rings or O-ring that are held in place in fixed axial locations on the spindle and thereby subdivide the space between the spindle 136 and the bore 134 into a series of longitudinally spaced annular sections 138, 140, 142 and 144. It will be observed that the end of the spindle slidable in the enlarged portion of the bore 134 likewise is enlarged and has mounted thereon a sliding annular sealing means such as an O-ring.

The spindle 136 is shiftable axially within the bore 134 between two extreme positions the right hand one of which is shown in FIG. 12 and which is determined by abutment of the right hand end of the spindle against a closure plug 146. The extreme left hand position of the spindle is determined in any suitable manner, e.g. by abutment of the O-ring flange for the extreme right hand O-ring against the shoulder between the small diameter and large diameter portions of the bore 134.

The valve spindle 136 includes an internal axial passageway 148 which at one end thereof is in communication with the exposed face of the enlarged (right hand) end of the spindle, i.e. the space facing the inner end of the plug 146. Desirably this end of the spindle is radially grooved from the internal passageway 148 outwardly to insure communication between said internal passageway and the space facing the inner end of the plug 146. The other end of the internal passageway 148 terminates at a lateral passageway 150 which communicates with the annular section 140. As mentioned earlier, I will not at this point describe the various passageways that are connected to the automatic cycling valve 92 nor will I describe the ports at which these passageways terminate in the bore 134. Such description will be set forth in connection with the operation of my hydropneumatic drive mechanism.

The start valve 94 is a simple off-on valve i.e. a two way valve, which either makes or breaks a fluid connection between two passageways. This valve is normally closed so as to break the connection. Said valve conveniently is located on the front block 60 and is manually operable by a handle (not shown).

The selector valve 96 conveniently is located in the front block 60. Said valve is illustrated in FIGS. 9, 10, 11 and 12. The valve includes a bore 152 and a spindle 154. One end of the spindle and bore, i.e. the right hand end as viewed in FIGS. 9–12, is of reduced diameter and the other end of the spindle and bore as shown in said figures is of enlarged diameter. The small right hand end of the bore is connected by a passageway 155 to the atmosphere. Adjacent the right hand end of the spindle I provide an annular space 156 the opposite ends of which are closed off as by a slidable annular sealing member e.g. O-rings 157. Additional O-rings 157a are provided on the spindle between the annular space 156 and the large diameter end of the bore in order to prevent leakage between oil in said large diameter end and air in the small diameter end of the bore. The large diameter end of the spindle is provided with a piston 158 the opposite ends of which are bounded by slidable annular sealing members, e.g. O-rings. Said piston includes an external axial and circumferential passageway 160, e.g. a spiral passageway, extending angularly through about 90° and terminating at its left hand end in a radial passageway 162 that leads from the external surface of the piston to the interior thereof. The forward end of the piston passageway 160 is adapted to communicate with a port in the enlarged end of the bore. The piston is an extremely good fit in the large diameter end of the bore so that unless the forward end of the passageway 160 is aligned with its associated port in the bore said passageway is disconnected from said port. An internal longitudinal passageway 163 (see FIG. 11) eccentric to the central axis of the selector valve runs from the front face (right hand) of the piston 158 to a lateral opening 164 in longitudinal alignment with the forward, i.e. right hand, end (the end nearest the small diameter portion of the bore 152) of the external passageway 160 for the piston 158 (see FIG. 10.)

The spindle 154 for the piston 158 is manually shiftable by a knob 166 protruding laterally from the front block 60 (see FIG. 9). Said spindle thereby can be selectively shifted longitudinally between two extreme positions the left-hand one of which is illustrated in FIGS. 9, 11 and 12 which for convenience will be referred to as the "out" position since the knob is extended. The retracted position of the knob and spindle 154 will be referred to as the "in" position.

Moreover, the spindle 154 can be selectively rocked i.e. oscillated, angularly between two extreme positions by manipulation of the knob 166. The limits of the angular rocking and the limits of the longitudinal shifting desirably are determined by the tip of a hollow pin 168 that projects radially inwardly of the large diameter end of the bore 152. Said tip is received in a deep indentation or recess 170 formed in the piston 158 which indentation opens laterally to the side of the piston in order to receive the tip of the pin 168. The axial length of the open lateral side of the recess 170 is such as to define by abutment between the tip of the pin 168 and the ends of said opening the limits of longitudinal movement of the spindle 154. The width of the open lateral side provided by the recess 170 is such as to define by abutment between the tip of the pin 168 and the sides of the recess the limits of angular rocking of said spindle. The lateral opening of the recess is of such shape, in the form of the invention illustrated, as to permit an angular rocking movement of about 90°.

Thus the selector valve has four positions which can be set by selective manipulation of the knob 166, to wit (a) out and counter-clockwise (which sets the drive mechanism for automatic cycling and which is the position shown in FIG. 12); (b) in and counter-clockwise (which sets the drive mechanism for emergency retract, i.e. retracts the slide member 40 regardless of the position which it may occupy just prior to setting the knob in its (b) position); (c) out and clockwise (which sets the drive mechanism for holding, i.e. will stop cycling, at either the forward or retracted end of the stroke whichever is reached first after setting the selector valve at its (c) position); and (d) in an clockwise (which sets the drive mechanism for a single cycle operation, i.e. which so arranges the circuit connections that the drive mechanism will, when suitably started in a cycle of operations, proceed through the entire cycle and come to rest after this single cycle in its retracted position).

The supplemental automatic cycling valve 97 (see FIG. 11) is housed within and carried by the selector valve 96 with which it cooperates. Said supplemental valve includes an axial bore 172 in the small diameter portion of the spindle 154 of the selector valve 96. The front end of the bore 172 is closed as by a vented screw 174 so that said end of the bore is blind. The rear end of the bore opens into the recess 170, this end of the bore being chamfered to provide a valve seat 175. A valve plug 176 made, for example, of an elastomeric material which is not deleteriously affected by oil, e.g. a synthetic rubber, is adapted to rest on the valve seat 175, an end surface of the plug being beveled to fit the chamfer of the seat. The plug is secured at the rear end of a guide stem 178 which is located within the blind bore 172. The guide stem is of sufficiently smaller diameter than the blind bore to form an annular space 179 around said stem. A transverse hole 180 in the spindle 154 of the selector valve 96 provides communication between this annular space 179 and the external surface of the small end of the spindle 154 in front of the front face of the piston 158 i.e. between said annular space 179 and the front end of the large diameter end of the bore 152 of the selector valve. The forward tip of the guide stem 178 carries an O-ring 182 which seals off the aforesaid annular space 179 from the front portion of the bore 172. The guide stem 178 and valve plug 176 are mildly biased toward open (unseated) position by a light helical compression spring 184 held between said guide stem and the blind end of the bore 172. It should be mentioned that in no position of the valve plug 176 is the radial passageway 162 blocked thereby, and, indeed, to insure unobstructed access to said passageway the plug 176 may be provided with a rearwardly extending projection 186 which will strike the rear wall of the recess 170 before the valve plug can interfere with flow through the passageway 162.

The trombone pump 98 (see FIGS. 3 and 12) is actuated by and in part carried by the inner central piston 82. As soon will be seen the function of this valve is to control the operation of the circuit for the drive mechanism in relation to the stroke of the slide member 40 without however utilizing any elements external to the drive mechanism that are actuated by said slide member or are operationally integral therewith. In other words, the trombone pump is arranged to pump a metered amount of an incompressible fluid in a quantity which is a function of the position of the inner central piston 82 in the inner cylinder 74. To the foregoing end the trombone pump includes both a stationary portion and a portion which moves with the piston 82 and which conjointly function as a positive displacement pump.

More specifically the trombone pump 98 comprises an outer first tube 188 which is secured to the piston 82 and projects forwardly therefrom (forwardly in the sense that it extends toward the slide 40), said tube 188, like all of the remaining tubes of the trombone pump soon to be described, being disposed axially of the inner cylinder 74, i.e. centrally with respect to the inner piston 82. The forward end of the first tube 188 is externally threaded for engagement with the crossbar 80. Actually said first tube 188 provides the external surface of the piston rod 84 and functions to connect the inner piston 82 with the crossbar in addition to acting as a part of the movable element of the metering trombone pump.

The trombone pump 98 further includes a second tube 190 substantially coextensive of and nested within the first tube 188, and rigidly secured at its rear end to the inner piston 82. The forward ends of both tubes are hermetically closed off as by a plug 192. The outer diameter of the second tube is somewhat smaller than the inner diameter of the first tube 188 whereby to provide an annular space 194 between said tubes. Two radial bypass passageways 196, 198 in the second tube connect the annular space 194 with the internal surface of the tube 190. The bypass passageway 196 is further forward than the bypass passageway 198 and both bypass passageways are near the front end of the tube 190.

Considering now the stationary part of the trombone pump, the same includes a third tube 200 and a substantially coextensive fourth tube 202. Both of these tubes are firmly secured to the stationary rear block 62 or, more specifically, to a plug 204 securely affixed to said block. The third and fourth tubes are coaxially disposed with respect to the first and second tubes. That is to say, their longitudinal axes are coincident with the longitudinal axes of the first and second tubes. The fourth tube is permanently nested within the third tube and the third tube is telescopible within the second slidable tube, that is to say the first and second tubes are slidable with respect to the fixed third and fourth tubes.

The third and fourth tubes are radially dimensioned to provide an annular space 206 between them and the second and third tubes are radially dimensioned to provide an annular space 208 between them where they overlap. Of course there is, in addition, a bore running the length of the stationary fourth tube 202. Said bore and the annular space 206 are closed at their forward ends by a plug 210 provided with a peripheral O-ring 212 which slidably engages the inner surface of the second slidable tube 190 and thereby seals the annular space 208 from the bore of the second tube forward of the plug 210. A generally axial passageway 214 through the plug 210 permanently connects the front face of the plug (and thereby the portion of the bore of the second tube 190 in front of the plug 210) with the annular space 206 between the stationary third and fourth tubes. A radial passageway 216 in the plug 210 permanently connects the bore of the fourth tube 202 with the annular space 208 between the second and third tubes. An O-ring 218 carried by the central piston 82 seals off the rear end of the annular space 208 and rides on the third tube 200. The rear end of the annular space 206 is suitably sealed off as by an internal flange at the rear end of the third tube 200.

It will be appreciated that when the piston 82 moves forwardly from its rearmost (retracted) position certain flows of the incompressible fluid (oil) are experienced within the trombone pump. For example, as the first and second tubes move forwardly with respect to the plug 210 the volume of the annular space 208 between the O-rings 212, 218 is reduced. Initially, the incompressible fluid escapes through the rearmost bypass passageway 198 into the annular space 194 and then through the bypass passageway 196 into the bore of the second tube forward of the plug 210. However, once the bypass passageway 198 has moved beyond the O-ring 212 further forward movement of the first and second tubes will force the incompressible fluid in the annular space 208 to flow through the radial passageway 216 and thence into the internal bore of the stationary fourth tube. Said expressed fluid will exit through the rear end of the fourth tube. At the same time the pressure in front of the plug 210 within the second tube is reduced. This reduction in pressure is transferred through the axial passageway 214 to the annular space 206 which is connected to a source of incompressible fluid (the oil reservoir 132) so that the space in front of the plug 210 will remain full of incompressible fluid. Reverse movement of the piston 82 reverses the aforesaid flows.

The stop valve 100 is a simple three way two position valve adapted to be manually actuated by a handle (not shown). In one position the valve 100 connects a passageway later to be described to the ambient atmosphere and disconnects this passageway from a compressed air supply. In the other position the aforesaid passageway is disconnected from the atmosphere and is connected to the source of compressed air. It may be mentioned that positioning the stop valve 100 so as to connect said valve to the high pressure air halts all motion of the hydropneumatic drive mechanism 22 so that in a sense the stop valve may be considered a panic valve inasmuch as its actuation abruptly halts movement of the slide member 40.

The bypass (diverting) valve 102 (see FIGS. 5 and 12) conveniently is located in the rear block 62 and comprises a bore 220 one end (the left hand end as viewed in FIGS. 5 and 12) is closed. A valve spindle 222 is reciprocable in said bore and has a pin 223 sealingly slidable through the closed end. One end, e.g. the left hand end, of the valve spindle 222 is of large diameter and is provided with sealing O-rings 224 to prevent flow of oil between this large diameter end of the valve body and the valve bore. A substantial portion of the right hand end of the valve body is of reduced diameter as indicated by the reference numeral 226, the extreme right hand end of this portion of reduced diameter being closed by a sealing O-ring 228 which thereby isolates the annular space 230 between the valve spindle and the inner surface of the bore 220. The right hand end of the bore 220 is connected to a source of incompressible fluid (the oil reservoir). Said valve body is biased toward the closed end of the bore by a helical compression spring 232 which is strong. Such strength is well below the high pressure of the incompressible fluid developed during a forward stroke of my driving mechanism 22. However, the strength of said spring exceeds that of a spring later to be described in connection with the feed start adjustment valve 110.

The cushion valve 104 (see FIGS. 5 and 12) conveniently is located in the rear block 62. It comprises a bore 234 having a large diameter portion and a small diameter portion. Slidable in the bore is a valve spindle 236 having a large diameter end and a small diameter end, respectively slidable in the large diameter portion and the small diameter portions of the bore. Said valve spindle is automatic in operation, i.e. is not manually operated. The large diameter end of the valve spindle 236 carries a sealing O-ring 238 which isolates from one another the left and right faces (as viewed in FIGS. 5 and 12) of the large diameter end of the valve body. The large diameter portion of the bore 234 at the right thereof has a bleed passageway 239 running to the ambient atmosphere. The small diameter end of the valve spindle is formed with a section 240 of reduced diameter the ends of which are formed by sealing O-rings 242, said section in conjunction with the valve bore 234 defining an annular space 244.

The adjustable cushion restriction valve 106 is an ordinary throttling valve, e.g. a needle valve, or the type of pin valve which will be described in detail hereinafter in connection with the valves 114 and 116. The restriction valve 106 is manually operated being set to any selected position by the man who, in the field, is in charge of the machine actuated by the drive mechanism 22.

The shutoff valve 108 (see FIGS. 5 and 12) conveniently is located in the rear block 62. It comprises a bore 246 having a large diameter portion and a small diameter portion. Slidable in the bore is a valve spindle 248 having a large diameter end and a small diameter end, respectively slidable in the large diameter portion and the small diameter portion of the bore 246. The valve spindle 248 is automatic in operation. The large diameter end of said valve spindle carries a sealing O-ring 250 which isolates from one another the left and right faces (as viewed in FIGS. 5 and 12) of the large diameter end of the valve body. The large diameter portion of the bore 246 at the right hand end thereof has a bleed passageway 251 running to the ambient atmosphere. The small diameter end of the valve spindle is formed with a section 252 of reduced diameter the ends of which are formed by sealing O-rings 254. Said section in conjunction with the valve bore 246 and an additional O-ring define two separate annular spaces 256, 257. A helical compression spring 258 urges the valve spindle toward the left hand side of the valve bore. The right hand end of the valve bore is connected by a passageway 260 to the atmosphere.

As indicated heretofore, there are a plurality of feed start adjustment (accumulator) valves 110, there being one for each tool position of the turret 44 so that in the example now being described there are six of these valves. The function of these valves, as later will be seen, is to determine when, during each feed in stroke, the feed in motion of the slide member 40 is to be decelerated from the rapid feed in to the slow operating portion of the stroke. There is a separate feed start adjustment valve for each different tool inasmuch as it frequently will be necessary for different tools to start the operative portions of their strokes at different positions of the drive mechanism. The several feed start adjustment valves (see FIGS. 3, 4, 5 and 12) are located in a distributor block 262 secured to the lower back surface of the rear block 62. Said distributor block may be of circular transverse cross-section as indicated in FIG. 5 and the six feed start adjustment valves are equiangularly positioned in a ring around the horizontal central axis of said distributor block in order that they may more readily cooperate with the distributor valve 112 soon to be described in detail. All of the feed start adjustment valves are alike so that the description of one of them now to be given will suffice for all.

A feed start adjustment (accumulator) valve 110 (see FIGS. 4 and 12) comprises a bore 264 having a closed front end (left end as viewed in FIGS. 5 and 12) and an open rear end, said rear end being closed by a centrally tapped plug 266. Said feed start adjustment valve is automatic in operation except for the manual adjustment soon to be described. A valve spindle 268 is slidable in the valve bore 264 being slidably sealed to the interior thereof by an O-ring 270. An abutment 272 is located adjacent the rear end of the valve bore 264, said abutment being slidable in the bore and being sealed to the interior thereof by an O-ring 274. The position of the abutment 272 within the valve bore is determined by a screw 276 threaded through the tapped plug 266 and having its front end rotatable in and captively secured to the abtument. Thus by rotating said screw the axial location of the abutment 272 within the bore 264 can be manually set as desired. The abutment determines the extent (limit) of the rearward movement of the valve spindle 268. A helical compression spring 278 located between the abutment and the valve spindle urges the valve spindle toward the front end of the bore 264. In order to centralize said spring it is sheathed around a rod 280 carried by the abutment and extending forwardly therefrom. The rear end of the valve spindle 268 is hollowed out to accommodate said spring and rod; however the hollow has a blind front end whereby to provide a seat for the compression spring and to prevent communication between the front and rear surfaces of the valve spindle.

The distributor valve 112 (see FIGS. 3, 4, 5 and 12) is coaxial with the horizontal center of the distributor block 262. In other words it is located at the center of the ring of feed start adjustment valves 110. Said distributor valve is indexed at the end of each retraction stroke of the drive mechanism 22. Conveniently, for this purpose, it is connected to the machine (the lathe 20) that is controlled by the drive mechanism, preferably being actuated by the indexing shaft 52.

To enable this actuation to be easily effected the rear end of the indexing shaft 52 is coupled to the forward end of a shaft 282 for the distributor valve. The coupling is such that the shaft 52 and the shaft 282 will turn together but can experience relative axial movement. Such interconnection may be carried out, for example, by forming the rear end 284 of the indexing shaft 52 to a noncircular shape, e.g. a hexagonal shape, and providing the forward end 286 of the distributor shaft 282 with a socket 288 of matching cross-sectional contour. It will be recalled that the indexing shaft 52 translates with the slide member 40 and is turned 60° each time that the turret 44 is rotated from one position to another. Accordingly, the distributor shaft 282 likewise will be turned 60° each time that the turret position is changed. Since there are six feed start adjustment valves equiangularly spaced in a ring, the distributor valve 112 can easily be arranged to sequentially select the next feed start adjustment valve each time that the distributor shaft 282 is turned 60°. It will be obvious, of course, that it is not necessary to maintain this spacing for the feed start adjustment valves 110 since passageways can be formed in the distributor block 262 to accommodate any type of angular spacing of said valves 110; nevertheless it will be understood by those skilled in the art, that the construction of the distributor block is substantially simplified by the use of the specified arrangement of the feed start adjustment valves.

The distributor valve 112 further includes a bore 290 within which is located a valve spindle 292. Said valve spindle is functionally integral with the distributor shaft 282; accordingly the valve spindle can rotate in its bore without translating therein. The distributor shaft 282 is held against translation by suitable shoulders, one, preferably constituting a C-ring 294, and said shoulders being located on opposite sides of the rear block 62 through which the shaft 282 passes.

The valve spindle 292 is subdivided into three sections, the first one for the feed start adjustment valves, the second one for the adjustable return feed valves and the third one for the adjustable forward feed valves, said third section being isolated from the first two sections by some suitable means, e.g. by an O-ring. The ends of the valve spindle are sealed off by O-rings. It is not necesary to seal the second and third sections from one another because both the forward and the return adjustable feed valves present such a substantial resistance to hydraulic flow that said valves themselves tend to inhibit any shunting flow of liquid. Moreover, the construction of said second and third sections is such, as soon will be pointed out, as to discourage flow between said sections.

The first section of the valve spindle, i.e. the section associated with the feed start adjustment valves, comprises an annular groove 296 from which there longitudinally extends rearwardly a short external passageway 298. The second section of the distributor valve spindle, i.e. the section for the adjustable return feed valves, comprises an annular groove 300 in communication with a forwardly extending short longitudinal external passageway 302. The grooves 296 and 300 are separated by an O-ring. The passageway 302 is in a solid large diameter portion of the valve spindle 292 which very closely fits the valve bore 290 so as to discourage leakage from the passageway 302 to the third section of the distributor valve spindle. Said third section constitutes an annular groove 304 in communication with a forwardly extending short longitudinal external passageway 306.

It will be apparent that all of said grooves and external passageways are formed in the valve spindle 292; therefore each time that the distributor shaft 282 is angularly indexed when the slide member is fully retracted, each of the three longitudinal external passageways 298, 302, 306 will be turned 60° from a position in which these passageways are connected to one each of the feed start adjustment valves, adjustable return feed valves and adjustable forward feed valves to a position in which said passageways are connected with the next successive one of each of said valves. At any given time when the distributor shaft 282 is idle, and this is all times except during the short indexing period at the end of the retraction stroke, the spindle 292 will connect in the hydraulic circuit one valve of each set of the three sets of valves.

As in the case of the feed start adjustment valves 110, there are a group of adjustable return feed valves 114 all of which are alike so that only one of them needs be described in detail. There are six adjustable return feed valves 114, one for each different cycle associated with a different turret position, and conveniently these six valves are arranged in a ring concentric with the ring of feed start adjustment valves so that they can easily be controlled by the distributor valve 112.

Each adjustable return feed valve 114 includes a bore 308 (see FIGS. 4, 5, 6 and 12). The forward end of the bore is closed, the rear end of the bore opens to the back end of the distributor block 262 and is closed by a tapped plug 310 in which there is threaded a screw 312 the forward end of which is located within the bore 308. A plunger 314 is slidable in the bore 308 being slidably sealed to the bore by an O-ring. Lying within the forward part of the bore is a restriction pin 316 the rear end of which abuts the front tip of the plunger 314 being held against the same, as soon will be appreciated in the description of the operation of my drive mechanism, by the force of oil flowing against its (the restriction pin's) fornt end.

It will be appreciated that by adjusting the screw 312 the restriction pin 316 may be made to occupy any selected position rearwardly of the front end of the bore 308. The diameter of the restriction pin is slightly, e.g. a few thousandths of an inch smaller than the diameter of the bore 308 whereby clearance is provided between these two elements for through flow of a hydraulic fluid, to wit, oil. However this clearance is quite small so that it presents a substantial frictional opposition to the flow of the oil. As the pin 316 is shifted rearwardly the length of the clearance space opposing the flow of oil is reduced so that the return feed valve offers less restraint; thereby any degree of restraint to the flow of oil can be selected for any specific adjustable return feed valve which is associated with any one of the turret positions. The screws 312 of the different adjustable return feed valves are manually set for any desired performance although the restriction valves themselves are automatic in operation.

The adjustable forward feed valves 116 are of the same construction as the adjustable return feed valves and are similarly arranged and located. Each comprises a bore 318, a plug 320, a screw 322, a plunger 324 and a restriction pin 326.

As clearly can be seen in FIGS. 4, 5 and 6, the several screws 276, 312, and 322 for the sundry feed start adjustment valves, adjustable return feed valves and adjustable forward feed valves are readily accessible at the rear of the distributor block 262 so that the operator at the machine can quickly set up hydraulic mechanism for any given operation.

The end-of-return stroke sensing valve 118 (see FIG. 12) is located in the rear block 62, necessarily being disposed in such a position that it can determine when the drive mechanism 22 is immediately adjacent the end of its retraction stroke. Said valve 118 includes a front-to-back bore 328 the rear end of which is closed as by a plug 330. The front end of the bore is connected by a reduced diameter portion to the rear end of the cylinder 64, that is to say, the rear end of the cylinder as defined by the rear block 62. Slidable in this portion of reduced diameter is a finger 332 the tip of which protrudes forwardly from the front surface of the rear block 62 into the hollow annular compressed air space defined by the cylinders 64 and 74. An O-ring 334 circumscribing the finger 332 seals this annular space from the bore 328 while permitting axial movement of the finger. The rear end of the finger supports a plunger head 336 slidable in the bore 328, said head being urged forwardly away from the plug 330 and into a finger protruding position by a helical compression spring 338. It will be apparent that at all times except when the drive mechanism is at or near the end of its retraction stroke the annular piston 76 will be clear of the tip of the finger 332 and said finger will be maintained in its extended position by the spring 338. But as the piston 76 nears the rear block 62 is will strike the tip of the finger 332 and force it rearwardly against the action of the spring 338. This contact takes place after the turret has started to index. The front face of the plunger head 336 is adapted to sealingly engage the shoulder separating the large and small diameter portions of the bore 328 so that in the forward position of the finger 332 there is no communication between these two portions of the bore. However, as soon as the finger 332 is even slightly displaced rearwardly the plunger head 336 will become unseated to provide communication between both portions of its bore. Desirably the periphery of the plunger head is grooved to encourage communication between both portions of the bore upon unseating of the head.

The repeat-or-stop cycling valve 120 (see FIGS. 7, 8 and 12) is located in the lower portion of the rear block 62 immediately forward of the valves 110, 114 and 116. It includes a bore 340 the rear end of which is closed as by a plug 342. The front end of the bore is of reduce diameter and terminates at the front surface of the rear block 62. A plunger 344 is slidable but not sealed within the bore and, like the plunger 336, forms a seal with the shoulder separating the two portions of the bore when the plunger is in its foremost position. When the plunger is displaced from this position the two portions of the bore are in communication with one another i.e. the valve is unseated. The plunger is urged to its foremost position by a helical compression spring 346. Extending forward from the plunger 344 and integral therewith is a finger of reduced diameter which provides sufficient clearance between itself and the reduced diameter portion of the bore to permit flow of air therethrough. The forward end of the finger bears against a ball 348 the front surface of which protrudes from the front surface of the rear block 62. The ball is smaller than the reduced diameter portion of the bore 340 to permit air to flow around the same and into the bore. However the forward end of the bore is constricted to captively retain the ball within the bore.

When the valve 120 is idle the spring 346 seats the plunger head 344 and prevents flow of air between the two portions of the bore; simultaneously, the tip of the plunger finger holds the ball 348 against the constricted front end of the bore. If subsequently the ball is pressed rearwardly it will unseat the plunger and thereby provide communication between the atmosphere and the large diameter portion of the bore 340.

To actuate the ball 348 and therefore the valve 120 I provide a screw 350 (see FIGS. 7 and 8) mounted in an actuator plate 352 carried by the distrobutor shaft 282. Said plate includes six tapped holes 354 uniformly arranged in a ring spaced the same distance from the shaft 282 as the ball 348 and each of which holes is adapted to receive a screw 350. For conventional operation of the turret lathe 20 all but one of these holes is provided with a screw 350. As later will be pointed out, if at the end of a retraction stroke of the drive mechanism 22 the ball 348 is depressed, a fresh advance stroke will be initiated but if the ball is not depressed automatic cycling will terminate. Therefore for a full complement of automatic cycles to take place, e.g. six cycles in the present case, five screws 350 will be provided in sequence for one after another screw to depress the ball each time that the turret turns and turns the shaft 282 with it until eventually a position of the plate 352 is reached where the vacant hole 354 is registered with the ball 348. At this time since the ball is not depressed automatic cycling will stop. It is to be noted that a screw which previously depressed the ball will leave the ball before the annular piston 76 strikes the finger 332 since indexing of the turret commences before the finger is moved.

The other three auxiliary start valves 122, 124 and 126 which are associated with the repeat-or-cycling valve 120 are of the same construction and therefore will not be detailed. Each of these valves is adapted to be actuated either by one or more screws carried by the actuator plate 352 and said valves may be connected to carry out any desired function. Optionally, the auxiliary start valves may be actuated by means of screws such as the screws 350 at different selected cycles or said valves may be connected to function upon operation of various parts of auxiliary devices asociated with the machine actuated by the drive mechanism 22. For example, the auxiliary-controlled automatic-start valve 122, although of the same construction as the valve 120, is so constructed that it will start a feed stroke of the drive mechanism 22 upon the occurrence of some other movement such for instance as the end of a transverse cutoff stroke. As will be explained hereinafter this occurrence can be arranged to supply an atmospheric connection to the finger projecting from the plunger head of this valve so that if at such time its ball has been depressed by a screw on the actuator plate and its plunger unseated, connections thereby will be set up to initiate a cycle of operations of the drive mechanism 22.

The oil reservoir 132 secured to the back of the rear block 62 (see FIG. 3). Said reservoir is conventional and simply comprises a vessel for holding oil. The rear end of the reservoir is closed by a spring loaded piston 358 so that oil in the reservoir always is maintained under pressure, this pressure being comparatively mild, for example 100 p.s.i. The forward end of the oil reservoir is connected in the hydraulic circuit soon to be described the connection being made through the oil reservoir check valve 128 (see FIG. 3) which permits flow out of the reservoir but no return flow. The oil reservoir filling check valve 130 is carried in the floating piston 358. There are several direct connections to the oil reservoir; so that unless otherwise stated hereinafter where a connection to the reservoir is described it will be understood to be unvalved, i.e. direct.

The connections between the various valves and other components of my hydropneumatic drive mechanism 22 now will be described in conjunction with the operation of said mechanism.

First I will outline the connections and operations which are pertinent to an automatic cycling forward and return stroke. As noted previously, for automatic cycling to take place the knob 166 for the selector valve 96 is set in its out and counterclockwise position, heretofore described as its (a) position, this being the position illustrated in FIGS. 9, 11 and 12.

To simplify the understanding of this operation the description will be started at that point of the stroke in which the drive mechanism 22 is moving the slide member 40 forwardly and the annular piston 76 is disengaged from the finger 332 of the end-of-return-stroke sensing valve 118 and is forward of a cushioning port, later to be described, in the large cylinder 64.

A suitable source of pneumatic power is included for actuating the drive mechanism 22, said source comprising an air supply 360, e.g. a storage tank containing compressed air. As the driving mechanism is moving forward the automatic cycling valve 92, the supplemental cycling valve 97, the bypass valve 102, the cushion valve 104, the shut-off valve 108 and the feed start adjustment valves 110 are in the positions indicated in FIG. 12, these valves having been caused to assume such positions in a manner which will later be described. High pressure air flows from the air supply 360 through a passageway 362 and a passageway 364 connected thereto to a port in the bore 134 for the automatic cycling valve 92. Said port for the passageway 364 is, when the valve spindle 136 is in its right hand position as viewed in FIG. 12, connected by the annular section 140 to a port for a passageway 366 which is connected to the front end of the hollow tie rod 68. The rear end of the tie rod 68 is connected by a passageway 368 to the rear, i.e. right hand, end of the large cylinder 64 thereby supplying air under pressure to the rear end of the annular piston 76 and thus driving the piston forward. Since the piston is connected by piston rods 78 to the cross-bar 80, this movement will drive the slide member 40 forwardly.

Such forward motion is not opposed by pressure on the front face of the annular piston 76 inasmuch as the front, i.e. left hand, of the large cylinder 64 is connected by a passageway 370 to a port in the bore 134 of the automatic cycling valve. This port, when the valve spindle 136 is in its right hand position illustrated, is connected by the annular section 138 to a passageway 372 which runs to the ambient atmosphere.

As indicated earlier, the forward motion of the actuating piston 76 is restrained (checked or held back) by the forward motion of the central piston 82 in the small cylinder 74. It will be recalled that the central piston rod 84 is connected to the cross-bar 80 so that as the slide member 40 is moved forward to approach a tool to the work piece 32, the central piston 82 is dragged along with the annular piston 76. Such motion of the central piston is opposed by a body of an incompressible liquid, e.g. oil, which fills the small cylinder 74 on both sides of the central piston 82 and, indeed, fills the entire hydraulic path connecting the opposite ends of said cylinder.

The oil which thus is placed under pressure at the portion of the cylinder 74 in front of the piston 82 escapes from this portion through a passageway 374 in the front block 60. Said passageway leads to a passageway 376 which is connected to the front end of the hollow tie rod 70. The rear end of the tie rod 70 is connected to a passageway 378 in the rear block 62. This latter passageway terminates at a port in the bore 246 of the shut-off valve. A passageway 380 likewise is in communication with said annular space 256. The passageway 380 runs to a passageway 382 that terminates at a port in the bore of the by-pass valve 102. Said port is in communication with the annular space 230 which annular space at such time also is in communication with the port for another passageway 384, the latter port being to the right of the port for the passageway 382. The passageway 384 runs from the by-pass (diverting) valve 102 to the annular space 257 of the shut-off valve 108. With the shut-off valve in the indicated position the annular space 257 also is in communication with a port for a passageway 386. Said passageway 386 runs to a port in the bore of the cushion valve 104, said bore being in communication with the annular space 244 of this valve. The cushion valve is in its left hand position as indicated in FIG. 12 and in this position the annular space 244 also communicates with a port for a passageway 388. The passageway 388 is connected to a passageway 390 that terminates in a port in the front face of the rear block 62 in line with the space within the small cylinder 74.

Thus the incompressible hydraulic fluid will flow from the left end of the small cylinder to the right end of the small cylinder, this flow being relatively free, i.e. inhibited only by the sizes of the various passageways, spaces and ports which are made large enough to allow the driving mechanism 22 to move forwardly rapidly so long as the oil path just described connects the two ends of the oil cylinder to one another. It will be appreciated that the path of free flow of oil depends upon the disposition of the by-pass (diverting) valve 102, the cushion valve 104 and the shut-off valve 108 in their left hand positions as illustrated in FIG. 12.

Because of the piston rod 84, the volume of oil displaced by forward movement of the central piston 82 is less than the space in back of the piston made available by such forward movement. The additional volume of oil needed to fill such space is supplied from the oil reservoir 132 through the outlet check valve 128 and a passageway 424.

It will be realized of course that although the flow of oil between the ends of the cylinder 74 on the forward stroke is stated to be free, the term "free" is used in a comparative sense and actually the cross-sections and dimensions of the various passageways, spaces and ports do create resistance to flow of the oil therethrough (thus supplying the desired restraint) so that the oil pumped from the front face of the piston 82 through the described hydraulic path to the rear face has pressure developed therein, caused by the resistance to flow. This pressure is utilized in the operation of my driving mechanism 22 to control the positions of certain of the valves.

For example, the cushion valve 104 is held in its illustrated position on the forward stroke because a passageway 392 leads from a port in the annular space 256 to the right hand end of the bore 234 of said cushion valve. It will be recalled that oil is supplied to the annular space 256 by the passageway 378 so that a high pressure is developed at the right hand end of the valve spindle 236. During the forward stroke of the driving mechanism the pressure at the left hand end of the valve spindle 236 is, at the most, the pressure of the air supply 360 urging the piston 76 forwardly and the large and small diameter ends of the valve spindle 236 are so proportioned that the high hydraulic pressure engendered by flow of oil exerts a greater force on the valve spindle 236 from the right than the pneumatic pressure does from the left whereby the cushion valve is maintained at this time in its left hand position.

The shut-off valve spindle 248 is maintained in its left hand position by the helical compression spring 258 since the pressure on both ends thereof is equal, aside from the force exerted by said spring. The right hand end of the bore 246 of the shut-off valve 108 is connected to atmosphere by the passageway 260. The left hand end of the bore 246 of the shut-off valve is connected by a passageway 394 to the stop valve 100 which is a manually controlled valve and at such time has been set to connect the passageway 394 to atmosphere and to disconnect the passageway 394 from a passageway 396 which is connected to the air supply passageway 362.

The bore 220 of the by-pass (diverting) valve 102 has its right hand end connected by a passageway 398 to an unvalved inlet opening to the reservoir so that the right hand end of said bore is at the oil reservoir pressure which as noted earlier, is a mild pressure. The left hand end of the bore 220 is, as soon will be seen, likewise exposed to the pressure of the oil in the reservoir at this time so that the hydraulic pressures at the two ends of the valve body 226 are balanced. However, the valve spindle 226 is maintained in its left hand position by the helical compression spring 232.

Oil under pressure is supplied to the left hand end of the valve spindle 226 by a passageway 400 which runs from a port at the left hand end of the bore 220 to a passageway 402. The passageway 402 is connected to the central bore of the fourth i.e. innermost tube 202 of the trombone pump 98. It will be remembered that for the most of the forward movement of the piston 82 oil is expressed out of the rear end of the innermost tube. The amount of oil expressed is comparatively tiny but the oil is pumped positively, i.e. in a specific predetermined volume which is a function of the forward travel of the drive mechanism. This oil starts to be pumped when the rear bypass passageway 198 crosses the O-ring 212 on the stationary plug 210 carried by the third and fourth tubes 200, 202 that are rigidly secured to the plug 204 fast in the rear block 62. Thereafter as the second tube 190 moves forwardly with the piston 82 the annular space 208 between the moving second tube and stationary third tube defined at its front end by the O-ring 212 and at its rear end by the O-ring 218 shortens so as to force oil through the radical passageway 216 into the central bore of the fourth tube 202 so that it will be forced out through the passageway 402.

Attention is called to the fact that the cross-sectional area of the annular passageway 208 is quite small so that the rate of flow of the metered oil is of small volume which for practical purposes is measured in drops. It therefore is important that at the start of the metering the annular passageway 208 should be full of oil. This is accomplished by permitting oil to flow freely into the annular space 208 when the O-ring 212 is between the two bypass passageways 196, 198. During this period oil is supplied to the space ahead of the stationary plug 210 (and hence to the bypass passageway 196) by the connection between the space in front of said plug and the oil reservoir. Such connection takes place through the axial passageway 214, the annular passageway 206 and a passageway 404 running from the rear end of the annular passageway 206 to an unchecked inlet to the oil reservoir.

Therefore at the beginning of a forward stroke for the drive mechanism, the pressure of the oil in the reservoir is transmitted through the bypass passageways in the trombone pump to the left hand end of the spindle 222 of the bypass valve 102.

As noted above the moment the bypass passageway 198 sweeps over the O-ring 212 the connection between the oil reservoir and the annular space 208 is cut off and a metered flow of oil in tiny amounts commences through the passageway 402.

Since the passageway 402 is connected to the passageway 400 which runs to a port at the left hand end of the bore of the bypass (diverting) valve 102 it would seem that this metered out flow of oil from the trombone pump 98 would force the valve spindle 226 of the bypass (diverting) valve to the right so as to cut off the port for the passageway 382 and thereby stop the comparatively free flow of oil from the left to the right hand end of the small oil cylinder 74. However this is not the case because the passageway 402 branches off to a port in the bore 290 of the distributor valve 112. Said port for the passageway 402 is aligned with the annular groove 296 and therefore the metered flow of oil from the trombone pump which is at high pressure is led to the longitudinal external passageway 298 of the first, i.e. feed start adjustment (accumulator) valve, section of the distributor valve.

There are six passageways 406 each terminating at a different port in the bore 290 at the first section of the distributor valve, said ports being spaced apart 60° so that at any given position of the distributor valve the longitudinal passageway 298 will be lined up with a port for a different passageway 406. Each passageway 406 runs to the left hand end of a different feed start adjustment (accumulator) valve 110. Hence, the metered oil pumped out of the innermost tube 202 of the trombone pump 82 will, instead of urging the valve spindle 222 of the bypass (diverting) valve 102 to the right, urge the valve spindle 268 of the then operative (connected) feed start adjustment (accumulator) valve 110 to the right thus preventing movement toward the right of the valve spindle 222.

The helical compression spring 278 of the then operative accumulator valve 110 is a weaker spring than the helical compression spring 232 of the bypass (diverting) valve 102 hence the oil will preferentially move the valve spindle 268. It will be observed that the right hand face of the valve spindle 268 is exposed to oil in the valve bore 264. However this oil is connected by a port in the bore 264 to a passageway 408 which terminates at the passageway 398 that runs to an unchecked inlet to the oil reservoir 132. Thereby the movement to the right of the valve spindle 268 will be inhibited only by the pressure of the oil in the reservoir and the weak spring 278. Accordingly, so long as the valve spindle 268 of the accumulator valve 110 is free to move to the right, no movement to the right will be experienced by the valve spindle 222 of the diverting valve 102.

But such movement of the valve spindle 268 does not continue indefinitely. It is stopped when the valve spindle 268 strikes the abutment 272 in the then operative accumulator valve 110. As earlier mentioned, the abutment 272 is set to some position by manipulation of the associated screw 276 which was regulated by the machine operator. As soon as the movement of the valve spindle 268 is halted the metered oil flowing through the passageway 402 will take the alternate path through the passageway 400 to the port at the left hand end of the bore 220 of the bypass (diverting) valve 102 causing the valve spindle 222 of the bypass valve to start moving to the right.

Up to this point the restraining force exerted by the central piston 82 upon forward movement of the annular piston 76 has permitted the piston 76 to move forwardly with fair rapidity. This portion of the forward stroke during which the drive mechanism shifts the slide member 40 forwardly is referred to as the "approach" portion. It is the period during which the tool at a given turret position approaches the workpiece 32 and at this period feed in movement of the turret desirably is rapid because no work is being performed on the workpiece 32. But, at the termination of approach period the forward movement of the piston 76 must be considerably slower. The second portion of the forward movement of the drive mechanism 22 is known as the "feed" portion of the forward stroke. The termination of the approach portion and the beginning of the feed portion of the forward stroke is caused by contact of the valve spindle 268 of the then effective feed start adjustment (accumulator) valve 110 against the abutment 272. Almost immediately thereafter the path for the comparatively free flow of oil between the two ends of the cylinder 74 is closed.

The aforesaid closure is effected by movement of the right hand O-ring 224 of the bypass (diverting) valve 102 over the port for the passageway 382. This shuts off the passageway 382 through which oil had been freely flowing and causes a diversion of oil from the passageway 382 to a passageway 410. The passageway 410 leads to an annular passageway 412 (see FIGS. 4, 6 and 12). Said annular passageway is connected by six passageways 414 to the left hand ends of all the bores 318 for the several adjustable forward feed valves 116. As soon will be seen only one of these valves is effective at any given time so it will be assumed that this is the valve now being described.

When the bypass (diverting) valve closes the passageway 382 the oil leaving the left hand side of the small oil cylinder 74 flows through the passageway 374, then the passageway 376, then the hollow tie rod 70, then the passageway 378, then the annular space 256, then the passageway 380, then the passageway 410, then the annular passageway 412 and finally a passageway 414 to the specific adjusting forward feed valve 116 then operative. This is the main path of oil exiting from the front portion of the small cylinder 74 and is not to be confused with the metered flow of oil from the trombone pump 98. Said main path of oil flows over the restriction pin 326 of the then effective valve 116 and through the clearance between said pin 326 and the bore 318 finally exiting from said valve 116 through a passageway 418.

The passageway 418 is connected to the restricted portion of the bore 308 of the adjustable return feed valve 114 associated with the same turret position. The restricted portion of the bore 408 is in turn connected by a passageway 420 that runs to the bore 290 of the distributor valve 112. The port for the passageway 420 (there are six of these ports, one for each different adjustable return feed valve 114) is aligned with the path swept by the longitudinal external passageway 302 of the second section of the distributor valve. Thus in any given angular (indexed) position of the passageway 302 it will be aligned with one of the ports for the passageways 420 and this will determine which of the adjustable return feed valves 114 and adjustable forward feed valves 116 then are operative. Thus the main flow of oil now passes longitudinally through the then effective adjustable forward feed valve 116 and transversely through the constricted part of the then effective adjustable return feed valve 114 to the distributor valve. The oil now flows through the annular groove 300 of the second section which is permanently in registration with the port for a passageway 422 that leads to an unchecked inlet to the oil reservoir 132. The oil then flows from the outlet end of the reservoir through the check valve 128 and the passageway 424 to the right hand end of the small cylinder 74.

To recapitulate, during the feed (slow) portion of the forward stroke oil flows from the left hand end of the small cylinder 74 to the oil reservoir 132 and then to the right hand end of the small cylinder, this flow being directed through the highly confined annular space between the restriction pin 326 and its associated bore 318 of the then effective valve 116. Due to the small cross-section of the restriction passageway the rate of flow of oil is greatly reduced whereby to obtain the desired slow forward speed of feed. This speed of slow feed can be increased or decreased by turning the adjustment screw 322 of the then effective valve 116 which increases or decreases the length of the restricted path of flow around the restriction pin.

Attention is called to the fact that, as noted heretofore, due to the presence of the piston rod 84 less oil is swept out from in front of the piston 82 than must flow into the space behind said piston. The additional amount of oil required is, however, supplied by the oil reservoir during the feed (slow) portion of the forward stroke.

During the forward advance portion of the cycle, which said portion includes the rapid approach and the slow feed, the automatic cycling valve 92 is maintained in its forward, i.e. feed, position which is with its spindle 136 at the right hand end of the bore 134 as shown in FIGS. 9 and 12. The spindle is held in this position by the presence of higher pressure at its left hand end than at its right.

The pressure on its left hand end is the high pressure of oil being forced from the left hand end of the small cylinder 74 (during either the rapid approach or slow feed). Said oil pressure is led to the left hand end of the bore 134 by a passageway 426 which is connected to the passageway 374. The passageway 426 runs to the hollow tip of the pin 168 so that the high pressure of this oil is present within the recess 170. Because the selector valve 96 is in the automatic cycling position (a) (out and counter clockwise) the pressure of the oil in the recess 170 is transmitted through the radial passageway 162 to the left hand end of the spiral passageway 160. The right hand end of the said spiral passageway is in alignment with the termination of a passageway 428 at a port in the bore 152 of the selector valve. The other termination of the passageway 428 is at a port at the left hand end of the bore 134 of the automatic cycling valve 92 so that high pressure oil from the left hand end of the cylinder 74 is applied to the left hand side of the spindle 136 forcing it to the right, i.e. forward, position.

The right hand end of the spindle 136 is exposed to air pressure. Said pressure originates at the source of air supply 360 being transmitted through the passageway 364 to the annular section 140 and then through the radial passageway 150 and the internal passageway 148 to the slotted right hand face of the valve spindle 136.

Despite the fact that the right hand end of the valve spindle 136 is larger than the left hand end, the oil pressure at the left hand end is sufficiently in excess of the air pressure of the source of supply 360 to maintain the valve spindle at its right hand, i.e. feed, position.

The forward travel of the drive mechanism is determined, i.e. defined by halting of the slide member 40, this taking place when the particular axially adjustable stop 50 which then is operative strikes the stationary abutment 49 on the bed 24 of the lathe. Because the forward travel of the central piston 82 thus is brought to a dead stop the pressure of the oil in front of said piston, and therefore the pressure of the oil throughout the entire circulating path between the two faces of said piston, suddenly drops from the high pressure which obtained during the forward movement of said piston to a prevailing (system) low pressure which is the pressure of the oil in the reservoir 132. The sudden drop of oil pressure immediately appears at the left hand end of the bore 134 of the automatic cycling valve 92.

At the same time there is present at the right hand face of the valve spindle 136 high pressure air at the pressure of the compressed air in the source of supply 360. The force exerted by this air on the right hand end of the spindle 136 exceeds the force exerted by the oil at reservoir pressure on the left hand side of the valve spindle so that a net force is applied to the valve spindle tending to move it to the left or retracting position.

However oil is an incompressible fluid, or substantially so, so that the valve spindle 136 can not move toward the left unless a ready escape route for the oil is provided. The oil can not escape through the path constituting the passageway 428, the spiral passageway 160, the radial passageway 162, the recess 170, the pin 168, the passageway 426 and the passageway 374 because this leads to the oil filled space in front of the central piston 82 and the piston 82 is stationary. Nor can the oil readily escape through the passageway 376 because the terminal of the passageway 382 is blocked off at the bypass valve 102 and the passageway 410 has its terminal impeded by a restriction pin 326. It is true that the oil could flow through the passageway 410 but the flow is so limited that it would take too long for the valve spindle 136 to move to the left.

Therefore, I specially provide a ready escape path for the oil at the left hand side of the bore 134 which escape path becomes effective at the moment that the oil pressure at the left hand side of the small or inner cylinder 74 quickly drops towards its minimum which is the pressure of the oil in the reservoir 132. Said escape path is provided by the supplemental automatic cycling valve 97.

During the forward movement of the oil piston 82 the valve plug 176 of said valve 97 is abutted against the valve seat 175 at the front end of the axial bore 172. One force tends to unseat the plug and one force tends to seat it. The seating force is the pressure of the oil in the recess 170, this being high pressure during the forward feed of my drive mechanism 22. The unseating force is the force supplied by the helical compression spring 184. Optionally there may be added to the unseating force the force supplied by the oil in the annular space 179 providing that the diameter of the seating surface of the plug 176 exceeds the diameter of the bore 152. The oil in said space is at the pressure of the oil in the reservoir 132 which is transmitted via a passageway 430 (connected to the passageway 422), the hollow tie rod 66 and a passageway 432 to the large diameter end of the bore 152 of the selector valve 96 and then from said bore through the hole 180 to the annular space 179.

When the forward movement of the oil piston 82 suddenly stops and the high pressure of the circulating oil drops to reservoir pressure, the plug is opened by the helical compression spring 184. This provides an escape path for the oil at the left hand end of the bore 134 of the automatic cycling valve 92 which escape path leads to the oil reservoir. Thereupon the valve spindle 136 quickly shifts to its left hand position since there is reservoir oil pressure at the left hand side of the spindle and high air pressure at the right hand side of the spindle. A bleed passageway 433 running to the atmosphere from the left hand side of the annular section 144 prevents checking of the left hand movement of the automatic cycling valve when the force of the air pressure at the right hand end of said valve over-balances the force of the oil pressure at the left hand end of said valve.

When the spindle 136 shifts to the left the annular section 140 connects the port for the passageway 364 with the port of the passageway 370 so that high pressure air now is applied to the left hand end of the annular air piston 76. Also in the new position of the valve spindle 136 the port for the passageway 366 is connected by the annular section 142 to a port for a passageway 434 which latter passageway is open to the atmosphere whereby the right hand face of the annular piston 76 is exposed to the atmosphere. Hence, the piston 76 will be driven to the right, i.e. will experience a retracting motion and will pull the cross bar 80 and slide member 40 with it retrogradedly.

During the return stroke it is desirable, since the tool still is in contact with the work piece 32 and since this enables a finishing cut to be made, to have the driving mechanism 22 move slowly rearwardly, that is to say, this portion of the retrograde stroke constitutes a slow return which return will become fast at a predetermined point when the tool is out of contact with work.

As the piston 76 moves to the right it carries the oil piston 82 with it, thereby forcing oil out of the right hand end of the oil cylinder 74. The oil can not flow through the passageway 424 into the reservoir 132 because of the outlet check valve 128. It does flow through the passageway 390 and then the passageway 388 to the annular space 244. The oil then proceeds through the passageway 386 to the annular space 257. It can not flow through the passageway 384 because the spindle 222 of the bypass (diverting) valve 102 is in its right hand position in which it blocks the passageway 382 but it does flow through a passageway 436 which has a port in said space 257 when the valve spindle 248 of the shut-off valve 108 is in its left hand position which it normally occupies. The passageway 436 runs to a port in the bore 290 of the distributor valve 112. Said bore is aligned with the annular groove 304 of the third section of the distributor valve 112. The oil flows through this annular groove down the longitudinal passageway 306 of said third section to that one of six passageways 438 which is rendered effective by the angular (indexed) position of the valve spindle 292 of the distributor valve 112. These passageways 438 lead to the left hand ends of the different adjustable return feed valves 114 so that oil from the right hand end of the oil cylinder 74 is directed to the adjustable return feed valve which is associated with the turret position for the cycle then being carried out. The oil flows over the surface of the restriction pin 316, through the passageway 420, through the longitudinal passageway 302 of the second section of the distributor valve, through the annular groove 300 of said second section, through the passageway 422, through the passageway 430, through the hollow tie rod 66, through the passageway 432, through the hole 180, past the open plug 176, through the recess 170, through the hollow pin 168, through the passageway 426, and finally through the passageway 374 to the left hand end of the small oil cylinder 74.

As the central piston 82 sweeps toward the right it expels more oil than is admitted at its left due to the presence of the piston rod 84. The excess oil flows into the oil reservoir unchecked through the passageway 422.

It may be mentioned that there is an alternate path for the flow of oil from the right hand end of the cylinder to the left hand end other than the one described but this alternate path includes a further restriction zone upon oil flow furnished by the adjustable forward feed valve 116 then in parallel circuit so that no appreciable flow of oil occurs over this branch path. Said branch path is from the bore of the adjustable return feed valve 114, through the passageway 418, through the restricted space of the adjustable forward feed valve 116 then effective, through the passageway 414, through the annular passageway 412, through the passageway 410, through the passageway 380, through the annular space 256, through the passageway 378, through the hollow tie rod 70, and through the passageway 376 to the passageway 374 that leads to the left hand end of the small cylinder 74.

While the piston 82 is moving back during its slow return portion of its retrograde stroke the trombone pump 98 is in operation. Said pump now is telescoping so as first to reduce the space in front of the plug 210 and second to increase the length of the annular space 208 between the second and third tubes 190, 200. As the annular space 208 lengthens it provides a reduced pressure within the bore of the fourth tube 202 (connected to it by the radial passageway 216) thereby inducing flow of oil from the left hand end of the bore 264 of the feed start adjustment (accumulator) valve 110. This flow takes place through the passageway 406, the longitudinal passageway 298 of the first section of the distributor valve 112, the annular groove 296 of said first section and the passageway 402.

Hence initially the valve spindle 268 moves forwardly (toward the left). When it reaches the left hand limit of its movement oil starts to flow from the left hand end of the bore 220 of the bypass (diverting) valve 102 through the passageway 400 and the passageway 402 into the central bore of the fourth tube 202 of the trombone pump 98 so that the bypass valve spindle 222 moves toward the left. At a certain point in the retracting movement of the piston 82 the right hand O-ring 224 will expose the port in the bore 220 of the passageway 382. This marks the end of the slow return stroke.

It will be observed that the return slow stroke is measured by the time it takes to empty the oil at the left hand side of the valve spindle 222 of the then effective feed start adjustment (accumulator) valve 110 and the oil at the left hand side of the valve body of the bypass (diverting) valve 102 so that the length of the slow feed return stroke is equal to the length of the slow forward feed stroke since the latter was measured by the time it took to fill up the left hand ends of said valves with oil.

As soon as the port for the passageway 382 is exposed the flow of oil from the right hand end to the left hand end of the cylinder 74 bypasses the then effective adjustable return feed valve 114. A comparatively free flow of oil now takes place from said right hand end through the passageway 390, through the passageway 388, through the annular space 244, through the passageway 386, through the annular space 257, through the passageway 384, through the annular space 230, through the now open passageway 382, through the passageway 380, through the annular space 256, through the passageway 378, through the hollow tie rod 70, through the passageway 376 and finally through the passageway 374 to the left hand end of the cylinder 74.

It will be recalled that, as previously mentioned, oil flows out of the right hand end of the cylinder 74 faster than it is admitted to the left hand end because of the piston rod 84. The excess oil returns to the oil reservoir 132 through the passageway 426, through the selector valve 96 and the supplemental automatic cycling valve 97 (now open), through the passageway 432, through the hollow tie rod 66, through the passageway 430 and through the passageway 422 unchecked back into the oil reservoir.

Since the just described paths for flow of oil from the right hand end to the left hand end of the oil cylinder 74 do not include any portions of such small cross-section as are provided by either type of adjustable valve 114, 116, the checking restraint exerted by the oil piston 82 is slight and permits the air piston 76, and thereby the drive mechanism 22, to move rapidly to the right, in this manner providing the fast portion of the return stroke, sometimes referred to as the "tool withdrawal" portion of the stroke which is in contrast to the slow speed of movement experienced during the finishing cut portion of the stroke while the then effective tool 48 still engages the work piece 32.

When the turret 44 nears the end of its retracting stroke and the slide member 40 is pulled back almost to the limit of its travel (but before the annular piston 76 strikes the sensing finger 332) the turret 44 is index rotated by the conventional lathe mechanism. The time required to rotate the turret varies from one lathe mechanism to another depending upon its original design, its length of use, its state of repairs and the maintenance it has received. The indexing time required for some turret mechanisms is large compared to the time it would require to reverse the movement of my drive mechanism from retract to forward and I therefore desirably provide in my drive mechanism an adjustable delaying arrangement which becomes operative as the drive mechanism nears the retracting end of its stroke but before the valve 118 is rendered effective. I have referred to such arrangement as a cushion arrangement. Specifically it constitutes the cushion valve 104.

It will be remembered that during the rapid return portion of the retrograde stroke oil flowed from the right hand end to the left hand end of the oil cylinder 74 through a path which included said cushion valve which then was in its left hand position as shown in FIG. 12. This path in part constituted the passageway 388, the annular space 244 and the passageway 386. The annular space 244 effected this connection in the said position of the valve. By shifting the valve spindle 236 I can break this connection which permitted comparatively free flow of oil and instead set up a connection which provides a restricted flow of oil.

The cushion valve spindle 236 is normally maintained in its left hand position. It is maintained in such position during the slow return stroke because at such time the left hand end of the valve spindle 236 is exposed to atmospheric pressure while its right hand end is exposed to the pressure of the oil in the reservoir 132 (although not exactly at reservoir pressure since oil is flowing in the path now to be described). The left hand end of the bore 234 of said cushion valve is connected by a port to a passageway 440 which runs to a cushion port 442 in the air cylinder 64. Said port is near the right hand (rear) end of the air cylinder and while the air piston 76 is in the slow return portion of its stroke is at atmospheric pressure, being connected to the atmosphere through the path heretofore recited. The right hand end of the bore 234 of the cushion valve is connected to the oil reservoir through a passageway 392, the annular space 256, the passageway 378, the tie rod 70, the passageway 376, the passageway 426, the selector valve 96, the supplemental automatic cycling valve 97 (now open), the passageway 432, the tie rod 66, the passageway 430 and the passageway 422 so that the pressure at said right hand end is influenced by reservoir pressure. The same condition exists during most of the fast return portion of the retrograde stroke of the annular piston 76.

But when, during the fast return portion of the retrograde stroke of said piston, said piston crosses the cushion port 442 said port is exposed to the high pressure air within the cylinder 64. When high pressure air is applied to the left hand end of the valve spindle 236 of the cushion valve 104 it will exert a force greater than the force exerted by the oil in the reservoir on the right hand end of the cushion valve. Accordingly the cushion valve spindle will shift to the right.

The shift to the right is sufficient to cut off the port for the passageway 388. However it will leave connected with the annular space 244 the bore for a passageway 446 which runs to the manually adjustable restriction valve 106. Said restriction valve also is connected to the passageway 390. Hence as soon as the cushion port 442 is exposed and causes the cushion valve spindle to shift to the right the path for the flow of oil from the right hand end to the left hand end of the oil cylinder 74 includes the restriction valve 106, resulting in a slowing down of the return stroke of the mechanism 22 near its extreme right hand end of travel and before the sensing valve 118 is actuated. This provides sufficient time for any operations that have to be performed as, for example, indexing of the turret. The restriction valve is manually adjustable to provide any selective period of cushioning action.

It should be pointed out that during the forward movement of my drive mechanism the cushion valve 104 remains in its left hand position as shown in FIG. 12 because throughout the forward stroke the right hand side of the valve spindle 236 is exposed to high pressure oil from the left hand end of the oil cylinder 74 through passageway 374, passageway 376, hollow tie rod 70, passageway 378, shut-off valve 108 and passageway 392. This pressure creates a force at the right hand end of the spindle 236 greater than the force created at the left hand end either by air at atmospheric pressure or by air at the pressure of the source 360 of high pressure air supply.

Mention also is made of the fact that as the trombone pump 98 telescopes the oil in the bore of the second tube 190 in front of the trombone plug 210 flows through the axial passageway 214 and the annular space 206 between the third and fourth tubes into the passageway 404 and from there into the oil reservoir. When the bypass port 198 sweeps over the O-ring 212 the oil in front of the plug 210 insures the refilling of the annular space 208 so that there will be a proper metering supply of oil in the trombone pump when the drive mechanism next reverses.

Finally as the annular air piston 76 moves rearwardly after being slowed down by the operation of the cushion valve it will strike the sensing finger 332 thereby connecting a passageway 448 with a passageway 450. The passageway 448 terminates at a port in the annular space in front of the plunger head 336 of the end-of-return-stroke sensing valve 118. The passageway 450 has one end terminating at a port in the bore 328 of this sensing valve. The other end of the passageway 450 terminates at a port in the bore 340 of the repeat-or-stop cycling valve 120.

When the turret finishes its 60° indexing rotation the tip of the screw 350 associated with the new turret position will rest on and depress the ball 348 of the repeat-or-stop cycling valve 120 thus admitting air at atmospheric pressure to the bore 340 of this valve. Immediately the pressure in the following path drops to atmospheric pressure, passageway 450, end-of-return-stroke sensing valve 118 (if by then actuated or when actuated), passageway 448, hollow tie rod 72, a passageway 452 which terminates at a port in the bore 152 of the selector valve 96, the annular space 156 in the selector valve, a passageway 456 terminating at one end in a port communicating with the annular space 156 and terminating at the other end in a port at the right hand end of the automatic cycling valve 92.

As described earlier, the right hand end of the bore of the automatic cycling valve 92 is supplied with air at high pressure from the source of air supply 360. This air is furnished along a path including the axial internal passageway 148. An intermediate portion of said internal passageway 148 contains a restriction so that when the pressure at the right hand end of the bore 134 of the automatic cycling valve momentarily is exposed to atmospheric pressure through the passageway around the ball 348 the pressure at the right hand end of said bore drops more rapidly than it can be rebuilt by air flowing from the air supply through the restricted internal passageway 148. Hence for a moment a low pressure prevails at the right hand end of the automatic cycling valve. At the same time the left hand end of the automatic cycling valve is exposed to oil at reservoir pressure as noted earlier and the total force on the left hand end of the valve spindle 136 then exceeds the total force at the right hand end of the said valve spindle so that the valve spindle is snapped to the right. Shifting of the spindle 136 supplies air at high pressure to the right hand side of the annular piston 76 to restart the forward stroke thereof. The piston 76 almost immediately leaves the sensing finger 332 at the end-of-return-stroke sensing valve so as to restore high air pressure to the right hand side of the spindle 136 but before then the oil pressure built up in front of the central piston 82 is transmitted through the selector valve 96 to the left hand end of the automatic cycling valve spindle so that said valve remains in its forward (right hand) position. The oil pressure build up reseats the valve plug 176.

It will be observed that to obtain automatic cycling (automatic start of a fresh cycle) it is necessary for a screw 350 to strike the ball 348. If all six holes 354 have screws positioned therein automatic cycling will continue indefinitely but if one of the holes has no screw, automatic cycling will stop when the actuator plate 352 reaches the position in which the unfilled hole 354 is in alignment with the ball 348. The driving mechanism 22 then will come to a halt and will await further manual control movement thereof for restarting the same. This control movement is supplied by the start valve 94 which when turned will shunt the passageway 448 and will connect the passageway 456 to the atmosphere, thereby causing the automatic cycling valve 92 to shift from its left hand retraction position to its right hand feed position.

It will be observed that the passageway 450 also is connected to a port in the bore of the auxiliary-controlled automatic-cycle-start valve 122. This provides an alternate method of restarting the automatic cycle of my hydropneumatic drive mechanism 22. The annular space in front of the plunger head of this valve 122 is connected by a passageway 458 to an alternate control as, for example, to a valve (not shown) in a subsidiary mechanism, e.g. a cut-off mechanism. Said valve in the cut-off mechanism normally isolates the passageway 458 from the ambient atmosphere but when the cut-off is completed it connects the passageway 458 to atmospheric pressure. The ball of the valve 122 is depressed by a screw carried by the actuator plate 352 in a turret position in which there is no screw 350 depressing the ball 348. Therefore as soon as the cut-off mechanism has completed its operation and supplies air at atmospheric pressure to the passageway 458 this pressure will be transmitted via passageway 450, valve 118, passageway 448, hollow tie rod 72, passageway 452 and valve 96 to the right hand end of the automatic cycling valve to restart automatic cycling. The front end of the valve 122 is sealed to the atmosphere so that mere actuation of its control ball does not admit air. Similar connections e.g. from a feeding device, etc. are provided for the valves 124 and 126 to restart automatic cycling upon the occurrence of other events as may be desired.

The description of the operation of my mechanism 22 as thus far set forth has been concerned wholly with automatic cycling which is the (*a*) position of the selector valve 96 i.e. out and counter-clockwise; the operation at the other positions of said valve now will be considered.

When the knob 166 of the selector valve is manipulated to set the same at its (*b*) position my mechanism is set up for an emergency retraction operation, that is to say, one which will retract the slide member 40 regardless of the position it may occupy just prior to moving the valve 96 to its (*b*) position. In its (*b*) position the valve spindle 154 is in and counter-clockwise. Due to the axial inward movement of the spindle 154 the lateral opening 164 will be registered with the port for the passageway 428 thereby connecting the left hand end of the bore 134 to the oil reservoir via passageway 428, lateral opening 164, internal longitudinal passageway 163, the intermediate portion of the bore 152 of the valve 96, passageway 432, hollow tie rod 66, passageway 430 and passageway 422.

The pressure exerted by the oil reservoir at the left hand side of the automatic cycling valve is less than the pressure exerted by the high pressure air at the right hand side of said valve. Accordingly the valve spindle 136 will shift to the left. This brings into effect the connections for retracting the air piston 76 in the manner heretofore described. The initial speed of the retraction will be fast or slow depending upon the particular position of the oil piston 82 at the time that the selector valve is thrown to its (*b*) position, it being apparent that if the speed initially is slow it subsequently will become rapid during the withdrawal portion of the stroke and eventually will be cushioned.

At the end of such emergency retraction stroke the drive mechanism will not recycle because high air pressure is maintained at the right hand end of the valve spindle 136 since the atmospheric bleeding connection through the annular space 156 of the selector valve is blocked off by (inward) right hand movement of the selector valve spindle.

When the knob 166 of the selector valve is manipulated to set the same in its (*c*) position my drive mechanism 22 is set up to hold itself at either end of the stroke it then is experiencing, i.e. at the end of the feed stroke or at the end of the retraction stroke as the case may be. In its (*c*) position the valve spindle 154 is out and clockwise. The clockwise movement of said spindle completely blocks off the port for the passageway 428 in the bore 152 and thereby traps the oil in the bore 134 at the left hand end of the valve spindle 136 of the automatic cycling valve 92. Accordingly said spindle can shift neither to the right nor to the left so that it is unable to reverse the supply of high pressure air to the cylinder 64 regardless of what manner of pressure is supplied (high or low) to the right hand end of the automatic cycling valve. This trapping of the oil at the left hand end of the automatic cycling valve does not, however, affect the operation of the drive mechanism 22 through the duration of either its forward or retraction stroke so that said mechanism will continue through such stroke until it reaches the end thereof and will then stop. It will be obvious that this stopping depends upon the inability of oil or any similar hydraulic fluid to compress or expand.

When the knob 166 of the selector valve is manipulated to set the same in its (*d*) position my drive mechanism is set up for a single cycle operation, i.e. one which so arranges the hydraulic circuit connections that said mechanism will when started in a cycle of operations proceed through one cycle and then come to rest in its fully retracted position.

In its (*d*) position the knob 166 and valve spindle 154 of the selector valve 96 are in and clockwise. By shifting the valve spindle to "in" position I cut off the air bleeder connection through the annular space 156 between the passageway 452 and 456. Also by rotating the valve clockwise in its "in" position I line up the radial passageway 162 with the passageway 428. Let it be assumed then at this time, as is normal for such operation, my drive mechanism is in its fully retracted position and idle. To start it I manipulate the start valve 94 to connect the passageway 456 to the atmosphere. This bleeds high pressure compressed air from the right hand end of the bore 134 allowing the then prevailing reservoir oil pressure at the left hand end of said bore to shift the valve spindle 136 of the automatic cycling valve to the right so as to start the forward stroke. The operations through the forward stroke are normal (as previously described), i.e. there is a rapid approach and a slow feed. When the end of the forward stroke is reached the reversal is normal, only the external spiral passageway 160 being by-passed. However when the end of the retraction stroke is reached the mechanism will not be automatically recycled because of the cut-off of the bleeder connection created by shifting the annular space 156 away from the bore for the passageway 452 so that the drive mechanism will come to a stop when the retraction stroke is completed.

It will be appreciated that it may be desirable to stop the drive mechanism instantly at any point of its operation. For this purpose I have provided the stop, i.e. panic, valve 100. This valve, as noted previously, is normally closed so as to break the connection between the passageways 394, 396 and thereby enable the shut-off valve 108 to remain in its left hand position as indicated in FIG. 12 for normal operations, e.g. automatic cycling, single cycling, emergency retract or hold at either end. When the stop valve 100 is manually actuated it connects passageway 394 to passageway 396 so as to lead air at high pressure to the left hand end of the bore 246 of the shut-off valve 108. This shifts the cut-off spindle 248 to the right since the air pressure is opposed only by the bias of the spring 258 and atmospheric pressure. When the valve spindle 248 moves to the right it isolates the bores of passageways 378 and 386. Isolation of these passageways prevents all circulation of oil between the right and left hand ends of the oil cylinder 74 so that the drive mechanism is brought to a dead stop.

It thus will be seen that I have provided a drive mechanism which achieves the several objects of my invention and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent,

1. In a fluid drive mechanism, a first cylinder, a fluid actuated first piston movable forwardly and rearwardly in said first cylinder and separating said cylinder into two chambers, a second cylinder, a second piston, said second piston being relatively movable forwardly and rearwardly in said second cylinder as a function of the movement of the first piston in its cylinder and separating said second cylinder into two chambers, a fluid actuated first valve means for selectively connecting either chamber of the first cylinder to a source of fluid under pressure, a second valve means including a restricted passageway, a liquid filled path including said second valve means connecting the two chambers of the second cylinder whereby when the liquid flows through said path and restricted passageway the liquid pressure in a portion of said path between the second piston and the restricted passageway is raised and whereby the movement of the first piston is restrained, a passageway connecting said portion of the path with the first valve means to maintain the first valve means in a first position in which fluid under pressure is supplied to one chamber of the first cylinder, and means biasing the first valve means to a second opposite position whereby when movement of the first piston is obstructed the high pressure of the liquid in said portion of the path will drop and the biasing means will shift the first valve means to its second position so as to supply fluid under pressure to the other chamber of the first cylinder and thereby reverse the direction of movement of the drive mechanism.

2. A drive mechanism as set forth in claim 1 wherein the biasing means is compressed air.

3. In a fluid drive mechanism, a first cylinder, a fluid actuated first piston movable forwardly and rearwardly in said first cylinder and separating said cylinder into two chambers, a second cylinder, a second piston, said second piston being relatively movable forwardly and rearwardly in said second cylinder as a function of the movement of the first piston in its cylinder and separating said second cylinder into two chambers, a fluid actuated first valve means for selectively connecting either chamber of the first cylinder to a source of fluid under pressure, a second valve means including a restricted passageway, a liquid filled path including said second valve means connecting the two chambers of the second cylinder when the first piston moves forwardly whereby when the liquid flows through said path and restricted passageway the liquid pressure in a portion of said path between the second piston and the restricted passageway is raised and whereby the movement of the first piston is restrained, a passageway connecting said portion of the path with the first valve means when the first piston moves forwardly to maintain the first valve means in a first position in which fluid under pressure is supplied to one chamber of the first cylinder and drives the first piston forwardly, and means biasing the first valve means to a second position in which fluid under pressure drives the first piston rearwardly whereby when movement of the first piston is obstructed the high pressure of the liquid in said portion of the path will drop and the biasing means will shift the first valve means to its second position so as to supply fluid under pressure to the other chamber of the first cylinder and thereby reverse the direction of movement of the drive mechanism.

4. In a fluid drive mechanism, a first cylinder, a fluid actuated first piston movable forwardly and rearwardly in said first cylinder and separating said cylinder into two chambers, a second cylinder, a second piston, said second piston being relatively movable forwardly and rearwardly in said second cylinder as a function of the movement of the first piston in its cylinder and separating said second cylinder into two chambers, a first valve means for selectively connecting either chamber of the first cylinder to a source of fluid under pressure, means providing two chambers in said first valve means for exerting opposite pressures on said valve means to operate the same, a second valve means including a restricted passageway, a liquid filled path including said second valve means connecting the two chambers of the second cylinder whereby when the liquid flows through said path and restricted passageway the liquid pressure in said path and the restricted passageway is raised and whereby the movement of the first piston is restrained, a passageway connecting said portion of the path with one of the chambers of the first valve means to maintain the first valve means in a first position in which fluid under pressure is supplied to one chamber of the first cylinder, means connecting the other chamber of the first valve means to a source of gas under high pressure through a restricted opening whereby to bias the first valve means to a second position whereby when movement of the fluid piston is obstructed the high pressure of the liquid in said portion of the path will drop and the compressed gas will shift the valve means to its second position so as to supply fluid under pressure to the other end of the first cylinder and thereby reverse the direction of movement of the drive mechanism at one chamber of its path of travel, and means to selectively connect said second chamber of the first valve means to a source of gas at low pressure whereby to oppositely reverse the direction of movement of the drive mechanism.

5. A drive mechanism as set forth in claim 4 wherein the selective connecting means includes a valve actuated by movement of a member separate from the drive mechanism.

6. A drive mechanism as set forth in claim 4 wherein the selective connecting means includes a valve responsive to the approach of the first piston to one end of its path of travel to connect the other chamber of the first valve means to the low pressure source of gas.

7. A drive mechanism as set forth in claim 6 wherein the selective connecting means further includes another valve actuated by movement of a member separate from the drive mechanism and connected in series with the valve responsive to the approach of the first piston to one end of its path of travel.

8. In a fluid drive mechanism, a first cylinder, a fluid actuated first piston movable forwardly and rearwardly in said first cylinder and separating said cylinder into two chambers, a second cylinder, a second piston, said second piston being relatively movable fowardly and rearwardly in said second cylinder as a function of the movement of the first piston in its cylinder and separating said second cylinder into two chambers, fluid means for alternately driving the first piston forwardly and rearwardly in its cylinder, an unrestrained liquid-filled path between the chambers of the second cylinder, said path including a liquid-filled shunt having a restricted passageway therein so that when effective it restrains movement of the first piston, and means to selectively divert the flow of liquid between the unrestrained path and the shunt, said diverting means including a metering pump which expresses a measured volume of a liquid as a function of the position of the second piston and a diverting valve which responds to a specific predetermined volume of such metered liquid.

9. In a fluid drive mechanism, a first cylinder, a fluid actuated first piston movable forwardly and rearwardly in said first cylinder and separating said cylinder into two chambers, a second cylinder, a second piston, said second piston being relatively movable forwardly and rearwardly in said second cylinder as a function of the movement of the first piston in its cylinder and separating said second cylinder into two chambers, fluid means for alternately driving the first piston forwardly and rearwardly in its cylinder, an unrestrained liquid-filled path between the chambers of the second cylinder, said path including a liquid-filled shunt having a restricted passageway therein so that when effective it restrains movement of the first piston, and means to selectively divert the flow of liquid between the unretained path and the shunt, said diverting means including a metering pump which expresses a measured volume of a liquid as a function of the position of the second piston, a diverting valve which responds to a specific predetermined volume of such metered liquid and an adjustable accumulator valve which variably delays response of the diverting valve to such specific predetermined volume of liquid.

10. In combination with a reciprocatable member, a metering pump including an element movable with said member to express a measured volume of a liquid as a function of the position of said member, a valve which is actuated in response to a specific predetermined volume of such metered liquid, said metering pump including two elements in telescopic relationship, one element being movable with the receiprocatable member and the other element being stationary, the inner of the telescopic elements being radially spaced from the outer of the telescopic elements to define a first annular space extending axially of said elements, said first annular space having its ends defined by sealing members at opposite ends of the two elements so that the space expands and contracts with movement of the reciprocatable member, said space being filled with liquid which is expressed upon contraction of said space to provide the measured volume of liquid.

11. A combination as set forth in claim 10 wherein the inner telescopic element is hollow, wherein a first passageway is provided connecting the first annular space with the interior of the inner telescopic member, and wherein a second passageway is provided connecting the interior of the inner telescopic member to a utilization member whereby the measured flow of liquid takes place through the second passageway.

12. A combination as set forth in claim 11 wherein the inner telescopic element comprises two functionally integral coextensive coaxial radially spaced tubes providing a second annular space therebetween, wherein a third passageway connects said second annular space to the interior of the outer telescopic element, and wherein a fourth passageway connects said second annular space to a source of liquid.

13. A combination as set forth in claim 12 wherein a fifth passageway is provided in the outer telescopic element which passageway has terminal ends communicating with the interior of the outer telescopic element, said ends being spaced longitudinally of the outer telescopic element and being located near that end of the outer telescopic element which forms a part of the first annular space when said first annular space is fully expanded, whereby the first annular space is connected to the source of liquid in fully expanded condition and is disconnected therefrom as said space contracts.

14. In a fluid drive mechanism, a first cylinder, a fluid actuated first piston movable forwardly and rearwardly in said first cylinder and separating said cylinder into two chambers, a second cylinder, a second piston, said second piston being relatively movable forwardly and rearwardly in said second cylinder as a function of the movement of the first piston in its cylinder and separating said second cylinder into two chambers, fluid means for alternately driving the first piston forwardly and rearwardly in its cylinder, an unrestrained liquid-filled path between the chambers of the second cylinder, said path including a plurality of liquid-filled shunts each having a different restricted passageway therein any of which when effective will restrain movement of the first piston, means to connect successive ones of said shunts to said path, means to selectively divert the flow of liquid between the unrestrained path and the connected shunt, said diverting means including a metering pump which expresses a measured volume of a liquid as a function of the position of the second piston, and a diverting valve which responds to a specific predetermined volume of such metered liquid for actuation thereof.

15. A fluid drive mechanism as set forth in claim 14 wherein a plurality of adjustable accumulator valves are provided, a different one being associated with each different shunt whereby to variably delay for each different shunt the response of the diverting valve to the metered volume of liquid.

16. A fluid drive mechanism as set forth in claim 15 wherein the adjustable accumulator valves are manually regulatable.

17. In a fluid drive mechanism, a first cylinder, a fluid actuated first piston movable forwardly and rearwardly in said first cylinder and separating said cylinder into two chambers, a second cylinder, a second piston, said second piston being relatively movable forwardly and rearwardly in said second cylinder as a function of the movement of the first piston in its cylinder and separating said second cylinder into two chambers, a fluid actuated first valve means for selectively connecting either chamber of the first cylinder to a source of fluid under pressure, a second valve means including a restricted passageway, a third valve means including a restricted passageway, a liquid filled path connecting the two chambers of the second cylinder whereby when the second pis- moves in a certain direction the pressurofhteepwodwo ton moves in a certain direction the pressure of the liquid propelled through the path by the piston movement will be raised and whereby the movement of the first piston will be restrained, means to selectively include the second valve means in the path after the second piston has travelled a moiety of its excursion in said certain direction so as to then reduce the velocity of the first piston in such direction, a passageway connecting said path with the first valve means to maintain the first valve means in a first position in which fluid under pressure is supplied to a chamber of the first cylinder to drive it in said certain direction so long as said second piston is travelling in said certain direction, means biasing the first valve means to a second position whereby when movement of the first piston is obstructed the high pressure of the liquid in the passageway will drop and the biasing means will shift the first valve means to its second position so as to supply fluid under pressure to the other chamber of the first cylinder and thereby drive the first and second pistons in an opposite direction, and means to selectively include the third valve means in the path while the second piston is travelling a moiety of its excursion in the opposite direction so as for said moiety to reduce the velocity of said first piston in said opposite direction.

18. A fluid drive mechanism as set forth in claim 17 wherein the means for selectively including the second valve means in the path and the means for selectively including the third valve means in the path comprises a metering means that expresses a volume of liquid as a function of the positions of the pistons and a diverting valve responsive to a specific predetermined volume of such metered liquid.

19. A fluid drive mechanism as set forth in claim 18 wherein a liquid accumulator is interposed between the metering means and the diverting valve.

20. A fluid drive mechanism as set forth in claim 19 wherein means is provided to vary the capacity of the liquid accumulator.

21. A fluid drive mechanism as set forth in claim 17 wherein plural second valve means and plural third valve means are provided and wherein an indexing valve is included to select in certain order one second valve means and one third valve means for each reciprocating back and for excursion of said pistons.

22. In a fluid drive mechanism, a first cylinder, a fluid actuated first piston movable forwardly and rearwardly in said first cylinder and separating said cylinder into two chambers, a second cylinder, a second piston, said second piston being relatively movable forwardly and rearwardly in said second cylinder as a function of the movement of the first piston in its cylinder and separating said second cylinder into two chambers, means to admit fluid under pressure alternately to the chambers of the first piston to alternately drive said pistons in opposite directions, a liquid-filled path connecting the chambers of the second cylinder and effective to restrain movement of the second piston and thereby of the first piston, a flow restriction means, a cushion valve responsive to the approach of the first piston to an end of its stroke to interpose the flow restriction means in said path so as to slow down the velocity of the first piston as it nears the end of its stroke, said cushion valve being fluid actuated, a port provided in the first cylinder which port is located to be exposed to high pressure fluid by the first piston near an end of a stroke of the first piston, and a passageway connecting the port to the cushion valve to actuate the same when high pressure fluid is led to the cushion valve for actuation thereof upon exposure of the port.

23. A fluid drive mechanism as set forth in claim 22 wherein the cushion valve is oppositely biased to unactuated position during the opposite stroke of the first piston by a fluid under high pressure and is oppositely biased to unactuated position during the first-named stroke of the first piston by a fluid under low pressure whereby the cushion valve will be actuated only upon exposure of the port to high pressure fluid.

24. In a fluid drive mechanism, a first cylinder, a fluid actuated first piston movable forwardly and rearwardly in said first cylinder and separating said cylinder into two chambers, a second cylinder, a second piston, said second piston being relatively movable forwardly and rearwardly in said second cylinder as a function of the movement of the first piston in its cylinder and separating said second cylinder into two chambers, a first valve means for selectively connecting either chamber of the first cylinder to a source of fluid under pressure, a liquid filled path connecting the two chambers of the second cylinder whereby when with the first valve in a certain position the second piston moves in a certain direction the pressure of the liquid propelled through the path by the piston movement will be raised and whereby the movement of the first piston will be restrained, means operable by opposing forces to oppositely actuate the first valve, one such force being the pressure of the liquid in the path whereby when the movement of the first piston is obstructed the high pressure of the liquid in the path will drop, and a second valve means for connecting said path to a liquid reservoir so as to permit the liquid to flow to said reservoir and thus allow the first valve to shift to an opposite position.

25. A fluid drive mechanism as set forth in claim 24 wherein the second valve means is operable by opposing forces, one such force being the pressure of the liquid applied to the first valve and the other force being a biasing means providing a force less than that of the high pressure of liquid and greater than that of the dropped pressure of the liquid.

26. In a fluid drive mechanism, a first cylinder, a fluid actuated first piston movable forwardly and rearwardly in said first cylinder and separating said cylinder into two chambers, a second cylinder, a second piston, said second piston being relatively movable forwardly and rearwardly in said second cylinder as a function of the movement of the first piston in its cylinder and separating said second cylinder into two chambers, a first valve means, a source of fluid under pressure, means connecting said first valve means to the chambers of the first cylinder, said first valve means being shiftable between two positions in one of which it connects fluid under pressure to one chamber of the first cylinder and the other of which it connects fluid under pressure to the other chamber of the first cylinder, a liquid filled path connecting the chambers of the second cylinder whereby when the second piston moves in a certain direction the pressure of the liquid propelled through the piston by the piston movement will be raised and whereby the movement of the first piston will be restrained, means to actuate the first valve means, said actuating means comprising a first and a second chamber providing opposing forces, means to supply fluid under pressure to the first chamber of the actuating means, a selector valve, said selector valve being movable between plural positions in one of which it connects the second chamber of the actuating means to the liquid filled path, the high pressure of the liquid in the path maintaining the first valve means in a position to supply fluid under pressure to one chamber of the first cylinder when the first piston moves in said certain direction, whereby when movement of the first piston in said certain direction is obstructed the high pressure of the liquid in said path will drop and the pressure of the fluid in the first chamber of the actuating means will shift the first valve means to its other position so as to supply fluid under pressure to the other chamber of the first cylinder, said selector valve having another position in which it isolates the liquid in the second chamber of the actuating means so that the position of the first valve can not be changed.

27. In a fluid drive mechanism, a first cylinder, a fluid actuated first piston movable forwardly and rearwardly in said first cylinder and separating said cylinder into two chambers, a second cylinder, a second piston, said second piston being relatively movable forwardly and rearwardly in said second cylinder as a function of the movement of the first piston in its cylinder and separating said second cylinder into two chambers, a first valve means, a source of fluid under pressure, means connecting said first valve means to the chambers of the first cylinder, said first valve means being shiftable between two positions in one of which it connects fluid under pressure to one chamber of the first cylinder and the other of which it connects fluid under pressure to the other chamber of the first cylinder, a liquid filled path connecting the chambers of the second cylinder whereby when the second piston moves in a certain direction the pressure of the liquid propelled through the piston by the piston movement will be raised and whereby the movement of the first piston will be restrained, means to actuate the first valve means, said actuating means comprising a first and a second chamber providing opposing forces, means to supply fluid under pressure to the first chamber of the actuating means, a selector valve, said selector valve being movable between plural positions in one of which it connects the second chamber of the actuating means to the liquid filled path, the high pressure of the liquid in the path maintaining the first valve means in a position to supply fluid under pressure to one chamber of the first cylinder when the first piston moves in said certain direction, whereby when movement of the first piston in said certain direction is obstructed the high pressure of the liquid in said path will drop and the pressure of the fluid in the first chamber of the actuating means will shift the first valve means to its other position so as to supply fluid under pressure to the other chamber of the first cylinder, said selector valve having another position in which it isolates the liquid in the second chamber of the actuating means so that the position of the first valve can not be changed, said selector valve in its first-named position connecting the first chamber of the actuating means to a low pressure source of fluid through a further valve whereby when fluid under pressure is being supplied to the other chamber of the first cylinder and the further valve is opened it will bleed the pressure of the fluid in the first chamber of the actuating means so as to shift the first valve means to its first position, said selector valve having a further position in which it blocks the connection of the first chamber of the actuating means to the source of low pressure fluid so as to prevent such reversing movement of the first valve means.

28. In a fluid drive mechanism, a first cylinder, a fluid actuated first piston movable forwardly and rearwardly in said first cylinder and separating said cylinder into two chambers, a second cylinder, a second piston, said second piston being relatively movable forwardly and rearwardly in said second cylinder as a function of the movement of the first piston in its cylinder and separating said second cylinder into two chambers, a first valve means, a source of fluid under pressure, means connecting said first valve means to the chambers of the first cylinder, said first valve means being shiftable between two positions in one of which it connects fluid under pressure to one chamber of the first cylinder and the other of which it connects fluid under pressure to the other chamber of the first cylinder, a liquid filled path connecting the chambers of the second cylinder whereby when the second piston moves in a certain direction the pressure of the liquid propelled through the piston by the piston movement will be raised and whereby the movement of the first piston will be restrained, means to actuate the first valve means, said actuating means comprising a first and a second chamber providing opposing forces, means to supply fluid under pressure to the first chamber of the actuating means, a selector valve, said selector valve being movable between plural positions in one of which it connects the second chamber of the actuating means to the liquid filled path, the high pressure of the liquid in the path maintaining the first valve means in a position to supply fluid under pressure to one chamber of the first cylinder when the first piston moves in said certain direction, whereby when movement of the first piston in said certain direction is obstructed the high pressure of the liquid in said path will drop and the pressure of the fluid in the first chamber of the actuating means will shift the first valve means to its other position so as to supply fluid under pressure to the other chamber of the first cylinder, said selector valve having another position in which it isolates the liquid in the second chamber of the actuating means so that the position of the first valve can not be changed, said selector valve having a further position in which it connects the second chamber of the actuating means to a source of liquid at low pressure so that in said further position of the selector valve the first valve means is shifted to a second position.

29. In a fluid drive mechanism, a first cylinder, a fluid actuated first piston movable forwardly and rearwardly in said first cylinder and separating said cylinder into two chambers, a second cylinder, a second piston, said second piston being relatively movable forwardly and rearwardly in said second cylinder as a function of the movement of the first piston in its cylinder and separating said second cylinder into two chambers, a first valve means, a source of fluid under pressure, means connecting said first valve means to the chambers of the first cylinder, said first valve means being shiftable between two positions in one of which it connects fluid under pressure to one chamber of the first cylinder and the other of which it connects fluid under pressure to the other chamber of the first cylinder, a liquid filled path connecting the chambers of the second cylinder whereby when the second piston moves in a certain direction the pressure of the liquid propelled through the piston by the piston movement will be raised and whereby the movement of the first piston will be restrained, means to actuate the first valve means, said actuating means comprising a first and a second chamber providing opposing forces, means to supply fluid under pressure to the first chamber of the actuating means, a selector valve, said selector valve being movable between plural positions in one of which the second chamber of the actuating means is connected to the liquid path and the first chamber of the actuating means is connected to a further valve leading to a source of fluid at low pressure, in another of which the second chamber of the actuating means is connected to a source of liquid at low pressure, in another of which the second chamber of the actuating means is isolated and in another of which the first chamber of the actuating means is isolated from the further valve.

References Cited in the file of this patent

UNITED STATES PATENTS

| | | |
|---|---|---|
| 2,326,498 | Rodal | Aug. 10, 1943 |
| 2,655,058 | Eschenburg et al. | Oct. 13, 1953 |
| 2,691,962 | Johnson | Oct. 19, 1954 |
| 2,735,404 | Komph | Feb. 21, 1956 |

FOREIGN PATENTS

| | | |
|---|---|---|
| 165,478 | Australia | May 21, 1953 |
| 324,391 | Switzerland | Sept. 30, 1957 |